(12) United States Patent
Taniyama et al.

(10) Patent No.: US 11,908,254 B2
(45) Date of Patent: Feb. 20, 2024

(54) RECORDING CONTROL APPARATUS, RECORDING APPARATUS, RECORDING CONTROL METHOD, AND PROGRAM

(71) Applicant: JVCKENWOOD Corporation, Yokohama (JP)

(72) Inventors: Hirofumi Taniyama, Yokohama (JP); Yasutoshi Sakai, Yokohama (JP); Keita Hayashi, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 0 days.

(21) Appl. No.: 17/833,359

(22) Filed: Jun. 6, 2022

(65) Prior Publication Data

US 2022/0301368 A1 Sep. 22, 2022

Related U.S. Application Data

(63) Continuation of application No. PCT/JP2020/044423, filed on Nov. 30, 2020.

(30) Foreign Application Priority Data

Jan. 31, 2020 (JP) ................................ 2020-014981

(51) Int. Cl.
*H04N 23/65* (2023.01)
*G07C 5/08* (2006.01)
*G06V 20/40* (2022.01)

(52) U.S. Cl.
CPC .......... *G07C 5/0866* (2013.01); *G06V 20/44* (2022.01); *G07C 5/0858* (2013.01); *H04N 23/65* (2023.01)

(58) Field of Classification Search
CPC .... G07C 5/0866; G07C 5/0858; G06V 20/44; H04N 23/65
See application file for complete search history.

(56) References Cited

U.S. PATENT DOCUMENTS

| 2009/0309987 | A1* | 12/2009 | Kimura ............ H04N 21/21815 348/222.1 |
| 2010/0171829 | A1 | 7/2010 | Yago et al. |
| 2013/0135509 | A1* | 5/2013 | Fuji ...................... H04N 23/631 348/333.02 |

(Continued)

FOREIGN PATENT DOCUMENTS

| EP | 2134080 A2 | 12/2009 |
| JP | 2009087007 A | 4/2009 |

(Continued)

*Primary Examiner* — Thai Q Tran
*Assistant Examiner* — Jose M Mesa
(74) *Attorney, Agent, or Firm* — Procopio, Cory, Hargreaves & Savitch LLP

(57) ABSTRACT

A recording control unit stores photographing data for a predetermined time period previously set based on detection of an event in a recording unit as event record data. A location information acquisition unit acquires location information of a recording apparatus. A communication control unit performs transmits transmission target information to an external apparatus, which is another apparatus, when it is detected that a location of the recording apparatus is separated from a location where the event is detected by a predetermined distance or more within a predetermined time period after the event is detected.

13 Claims, 13 Drawing Sheets

(56) References Cited

U.S. PATENT DOCUMENTS

2016/0155004 A1* 6/2016 Shiraishi .................. G08G 1/20
                                                                    348/77
2019/0259227 A1* 8/2019 Oesterling ............. G07C 5/008

FOREIGN PATENT DOCUMENTS

| JP | 2017049683 A | 3/2017 |
| JP | 2019032725 A | 2/2019 |
| KR | 20110041626 A | 4/2011 |

* cited by examiner

RECORDING CONTROL APPARATUS, RECORDING APPARATUS, RECORDING CONTROL METHOD, AND PROGRAM

CROSS REFERENCE TO RELATED APPLICATION

The present application is based upon and claims the benefit of priority from Japanese Patent Application No. 2020-014981, filed on Jan. 31, 2020, the entire contents of which are hereby incorporated by reference.

BACKGROUND

The present disclosure relates to a recording control apparatus, a recording apparatus, a recording control method, and a program.

A widely-used dashboard camera includes means for acquiring data such as images by photographing a scene of an event around a vehicle and means for detecting that the vehicle has received some kind of impact, and stores the images and the like for a predetermined time period in a reproducible manner based on a time point when the impact on the vehicle is detected. For example, Japanese Unexamined Patent Application Publication No. 2009-087007 discloses a dashboard camera for recording image data based on a transition of acceleration. Such a dashboard camera, when it detects an event caused by an accident or the like, stores photographing data obtained by photographing a scene of the accident or the like in a reproducible manner. When abnormal acceleration is detected due to dangerous driving or the like, the dashboard camera stores the state of the dangerous driving in a reproducible manner.

Further, Japanese Unexamined Patent Application Publication No. 2019-032725 discloses a dashboard camera for transmitting event record data generated by detection of an event to another apparatus using radio communication means. By doing so, the moving image data can be stored in a server.

SUMMARY

In the event of an accident, parties of the accident or the parties and the police may reproduce event record data stored by a dashboard camera to check a circumstance of the accident.

However, before or at the time of checking the circumstance of the accident, there is a possibility that one malicious party may steal and take away the dashboard camera of the other party in order to destroy the event record data (evidence) in which the circumstance of the accident is recorded, or dispose of the dashboard camera while escaping. In such cases, it may be difficult to check the event record data and to appropriately understand the circumstance of the event.

As in Japanese Unexamined Patent Application Publication No. 2019-032725, by transmitting the event record data to an external apparatus, it is possible to prevent the event record data serving as evidence from being lost. However, since an event is generally detected by acceleration applied to the vehicle, the acceleration not related to the accident is often detected as an event. It is not efficient to transmit all such generated event record data to the other apparatus.

Thus, the embodiments provide a recording control apparatus including: a photographing data acquisition unit configured to acquire photographing data photographed by a photographing unit; an event detection unit configured to detect an event of a mobile object; a recording control unit configured to store the photographing data for a predetermined time period corresponding to the event detected by the event detection unit as event record data in a recording unit; a location information acquisition unit configured to acquire location information of a recording apparatus including at least the recording control unit; and a communication control unit configured to perform control for transmitting, to another apparatus, the location information of the recording apparatus acquired by the location information acquisition unit or the event record data stored in the recording unit when a location of the recording apparatus is separated from a location where the event is detected by a predetermined distance or more within a predetermined time period after the event is detected.

The embodiments further provide a recording apparatus including: the above recording control apparatus; the photographing unit; a display unit configured to display the photographing data photographed by the photographing unit; the recording unit; a GNSS reception unit configured to output a GNSS reception signal to the distance calculation unit; and an internal power supply configured to supply power to the recording apparatus.

The embodiments further provide a recording control method including: acquiring photographing data photographed by a photographing unit; detecting an event of a mobile object; storing the photographing data for a predetermined time period corresponding to the event detected by the event detection unit as event record data in a recording unit; acquiring location information of a recording apparatus for storing at least the event record data in the recording unit; and performing control for transmitting, to another apparatus, the location information of the recording apparatus or the event record data stored in the recording unit when a location of the recording apparatus is separated from a location where the event is detected by a predetermined distance or more within a predetermined time period after the event is detected.

The embodiments further provide a program for causing a computer to execute steps of: acquiring photographing data photographed by a photographing unit; detecting an event of a mobile object; storing the photographing data for a predetermined time period corresponding to the event detected by the event detection unit as event record data in a recording unit; acquiring location information of a recording apparatus for storing at least the event record data in the recording unit; and performing control for transmitting, to another apparatus, the location information of the recording apparatus or the event record data stored in the recording unit when a location of the recording apparatus is separated from a location where the event is detected by a predetermined distance or more within a predetermined time period after the event is detected.

DETAILED DESCRIPTION

Specific embodiments to which the present disclosure is applied will be described in detail below with reference to the drawings. However, the present disclosure is not limited to the following embodiments. For clarity of description, the following description and drawings have been simplified as appropriate.

A configuration of embodiments will be described below with reference to the drawings. FIGS. 1 to 4 show a recording apparatus 10 according to this embodiment. A recording apparatus 10 according to this embodiment is used in a mobile object such as an automobile and controls recording of photographing data photographed by a photographing unit such as a camera, and is, for example, a dashboard camera. A recording control apparatus 100, which is a control unit of the recording apparatus 10, has a function of storing the photographing data for a preset time period as "event record data" using, for example, acceleration due to an impact applied to the mobile object, such as an unexpected impact due to a collision accident, as a trigger. By reproducing the event record data using the recording apparatus 10 or another reproducing apparatus and viewing images of the reproduced event record data, a driver of the automobile or the like can understand a circumstance of the event. When the recording apparatus 10 is provided with a reproducing function of the event record data or the like, the recording apparatus 10 may be referred to as a recording and reproducing apparatus. Note that the mobile object is not limited to a vehicle, and instead may be a person or an animal in addition to, for example, a motorcycle, a drone, an airplane, or a ship. Hereinafter, the vehicle will be described as an example of the mobile object.

First Embodiment

Figure 1:
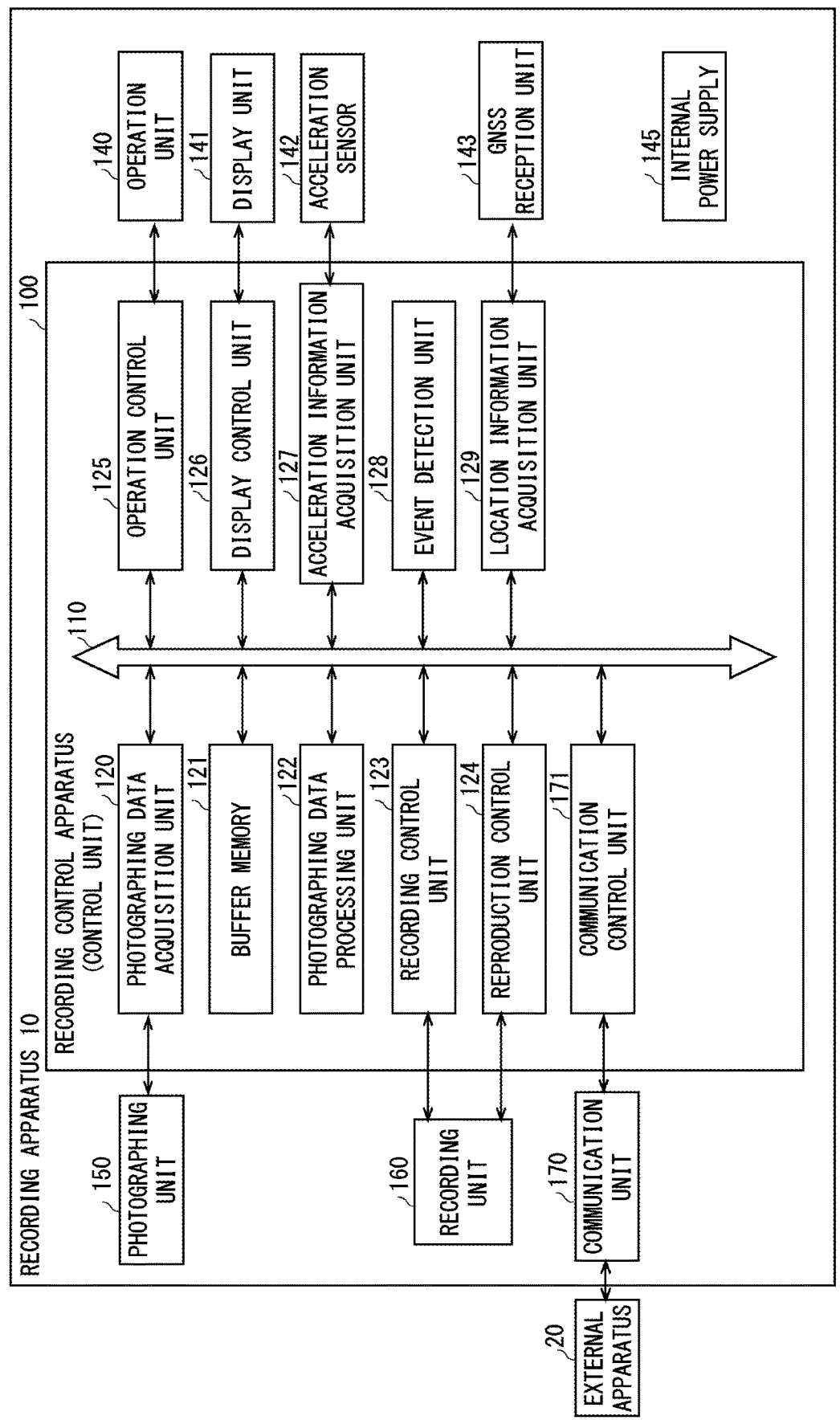
FIG. 1 is a block diagram showing a configuration of a recording apparatus including a recording control apparatus according to a first embodiment.

FIG. 1 is a block diagram showing a configuration of the recording apparatus 10 including the recording control apparatus 100 according to the first embodiment. As shown in FIG. 1, the recording apparatus 10 includes the recording control apparatus 100 and a plurality of components connected to the recording control apparatus 100. The recording control apparatus 100 functions as a control unit for controlling each component. The recording control apparatus 100 is a control apparatus having a circuit board on which a CPU (Central Processing Unit), a GPU (Graphics Processing Unit), a memory, a plurality of interfaces, etc., are mounted. The control unit 100 executes stored programs to thereby execute various processes. The components connected to the recording control apparatus 100 will be described later.

The recording control apparatus 100 according to this embodiment will be described in detail below with reference to FIG. 1. The recording control apparatus 100 also functions as a functional computing unit for executing each of the subdivided processes. Specifically, the recording control apparatus 100 may include a photographing data acquisition unit 120, a buffer memory 121, a photographing data processing unit 122, a recording control unit 123, a reproduction control unit 124, an operation control unit 125, a display control unit 126, an acceleration information acquisition unit 127, an event detection unit 128, a location information acquisition unit 129, and a communication control unit 171. For convenience, each of these components is shown in FIG. 1 as being connected to a bus line 110.

The photographing data acquisition unit 120 acquires the photographing data supplied from the photographing unit 150 such as a camera. The photographing data acquisition unit 120 supplies the photographing data to the buffer memory 121 through the bus line 110.

The buffer memory 121 is a volatile or non-volatile memory apparatus. The buffer memory 121 sequentially receives the photographing data periodically generated by the photographing unit 150 through the photographing data acquisition unit 120, and temporarily stores the received photographing data.

The photographing data processing unit 122 generates a photographing file of a format conforming to a predetermined preset format for a fixed period from the photographing data stored in the buffer memory 121. The preset format is, for example, H. 264 and MPEG-4 (Moving Picture Experts Group), but the present disclosure is not limited to them. The period during which the photographing file is generated is, for example, 60 seconds, but the present disclosure is not limited thereto.

The photographing data processing unit 122 may process the photographing data to generate the photographing file having a preset angle of view. The photographing data processing unit 122 may perform various processes on the photographing data output from the buffer memory 121, generate the photographing data of a preset time or a preset angle of view, and add header information such as a file name to generate the photographing file. Further, the photographing data processing unit 122 may process the photographing data output from the buffer memory 121 to perform noise removal, distortion correction, and the like on the photographing data, or may generate the photographing file which displays time information, vehicle velocity information, vehicle location information, etc. in the photographing data.

The recording control unit 123 controls the recording unit 160 to record the photographing file generated by the photographing data processing unit 122. When the event detection unit 128 detects an event, the recording control unit 123 stores the photographing data (photographing file) for a predetermined time period preset based on the detection of the event in the recording unit 160 as the event record data which is prohibited from being overwritten. Such a photographing operation is referred to as an event record operation. The photographing file for the predetermined time period preset based on the detection of the event is, for example, the photographing file for 30 seconds before and after the time when the event is detected. The recording control unit 123 can store the event record data in a predetermined recording area in the recording unit 160. The predetermined recording area is, for example, a recording area in which overwriting or erasure is prohibited. Alternatively, the event record data supplied to the recording unit 160 by the recording control unit 123 may be stored with a flag indicating that overwriting or erasure is prohibited added to a file of the event record data.

The recording control unit 123 performs control for recording, in the recording unit 160, information indicating whether or not the event record data stored in the recording unit 160 has been reproduced by the reproduction control unit 124 in the past. By doing so, the reproduction control unit 124 can identify which event record data is not reproduced.

If the event detection unit 128 has not detected an event, the recording control unit 123 may store the photographing file in the recording unit 160 in a state in which the photographing file can be overwritten. The photographing file stored in the recording unit 160 in a state in which the photographing file can be overwritten and different from the event record data is referred to herein as a "normal file". When a storage capacity of the recording unit 160 reaches an upper limit, the recording control unit 123 may delete the old normal file and record the newly generated normal file in the recording unit 160. Such a photographing operation is referred to as a loop recording operation.

The reproduction control unit 124 performs processing for reproducing the stored event record data and the normal file. When the reproduction of the stored event record data is started, the reproduction control unit 124 decodes and perform other processes on the event record data stored in the recording unit 160, and then supplies the reproduced image data to the display control unit 126.

The operation control unit 125 acquires operation information received by the operation unit 140, and outputs an operation instruction based on the operation information to each component. When the operation control unit 125 obtains an instruction to select various data to be reproduced from the operation unit 140, the operation control unit 125 controls the reproduction control unit 124 to select a file or the like recorded in the recording unit 160. When the operation control unit 125 obtains an instruction regarding the reproduction of various data from the operation unit 140, the operation control unit 125 controls the reproduction control unit 124 to perform processing related to the reproduction. The instructions related to the reproduction of the various data are, for example, reproduction start, pause, reproduction stop, enlarged display, etc.

The display control unit 126 controls the display unit 141 to display various information. For example, the display control unit 126 controls the display unit 141 to display the photographing data which is being photographed by the photographing unit 150. The display control unit 126 receives the event record data supplied from the reproduction control unit 124, and displays the received event record data on the display unit 141. When a touch sensor is superimposed on the display unit 141 as a function of the operation unit 140, the display control unit 126 controls the display unit 141 to appropriately display an icon corresponding to the touch sensor.

The acceleration information acquisition unit 127 receives information about acceleration detected by the acceleration sensor 142 mounted on the recording apparatus 10 and outputs it to the event detection unit 128. Note that the acceleration information acquisition unit 127 may acquire information about acceleration from an acceleration sensor (not shown) mounted on a moving body such as a vehicle instead of the acceleration sensor 142 mounted on the recording apparatus 10.

The event detection unit 128 detects an occurrence of the event of the mobile object from a magnitude of a signal and a signal pattern of the received information based on the information about the acceleration acquired from the acceleration information acquisition unit 127. The acceleration detected as the event of the mobile object is, for example, acceleration generated by an impact generated when the vehicle as the mobile object collides with another object.

When the event detection unit 128 detects that the information received from the acceleration information acquisition unit 127 corresponds to an occurrence of a predetermined event, it supplies a signal indicating that the occurrence of the event is detected to the recording control unit 123. An event is considered to have occurred, for example, when acceleration generated due to an accident in which an object collides with a vehicle is detected. For example, when acceleration exceeding a preset magnitude in a preset direction is detected beyond a preset time period, or when a change in the acceleration is large in a preset time period, the event detection unit 128 detects the occurrence of the event. The event detection unit 128 may detect the acceleration in the X, Y, and Z axes, which are coordinate axes of the 3-axis coordinates, or may detect the acceleration in at least one of these axial directions. The event detection unit 128 may weight the acceleration received from these three axial directions.

The location information acquisition unit 129 receives a GNSS (Global Navigation Satellite System) reception signal from a GNSS satellite received by a GNSS reception unit 143, calculates the location information that is information about a current location from the received signal. The location information acquisition unit 129 supplies the calculated location information to the recording control unit 123 and the communication control unit 171. The location information includes, for example, the latitude and longitude of the vehicle at the time when the signal is received from the GNSS satellite. Since the GNSS reception unit 143 is present in the recording apparatus 10, the location information acquisition unit 129 acquires the location information of the recording apparatus 10. The recording control unit 123 may record the location at which the event is detected together with the event record data.

The communication control unit 171 transmits transmission target information to an external apparatus 20, which is another apparatus, when it is detected that the location of the recording apparatus 10 is separated from the location where the event is detected by a predetermined distance or more within a predetermined time period after the event is detected. For example, if the communication control unit 171 detects that the location of the recording apparatus 10 is separated from the location where the event is detected by the predetermined distance or more within the predetermined time period after the event detection unit 128 detects the event, the communication control unit 171 may transmit the transmission target information to the external apparatus 20, which is another apparatus. Alternatively, the communication control unit 171 may transmit the transmission target information to the external apparatus 20 when the communication control unit 171 detects that the location of the recording apparatus 10 is separated from the location where the event is detected by the predetermined distance or more within the predetermined time period after the recording control unit 123 has stored the event record data. The transmission target information is the location information of the recording apparatus 10 or the event record data stored in the recording unit 160.

For example, the communication control unit 171 calculates a difference between the location information when the occurrence of the event is detected and the current location information as needed, and when the difference reaches the predetermined distance, the communication control unit 171 detects that the location of the recording apparatus 10 is separated from the location where the event is detected by the predetermined distance or more. That is, if the communication control unit 171 detects that the distance between the location information of the recording apparatus 10 when the occurrence of the event is detected and the location information of the recording apparatus 10 after the occurrence of the event becomes more than or equal to the predetermined distance, it may transmit the transmission target information to the external apparatus 20. The location information of the recording apparatus 10 when the occurrence of the event is detected corresponds to the location information of the vehicle when the occurrence of the event is detected. When the location of the recording apparatus 10 is separated from the location where the event is detected by the predetermined distance or more within the predetermined time period after the event is detected, the possibility that the recording apparatus 10 has been taken away is extremely high. When an event occurs, a driver of a vehicle often stops the vehicle in the vicinity of a place where the event has occurred. Nevertheless, if the location of the recording apparatus 10 is separated from the location where the event is detected by the predetermined distance or more within the predetermined time period after the event is detected, there is a high possibility that the recording apparatus 10 has been taken away by a malicious party or the like (the other party of the accident, etc.).

The predetermined distance referred to here is a distance that, for example, after an event such as an accident occurs, the recording apparatus 10 is taken away and clearly hinders the check of the event record data. For example, a distance of 1000 m or more is set as the predetermined distance. The time (predetermined time period) corresponding to the predetermined time period is, for example, a time after the event has occurred at which another party may take away the recording apparatus 10 at the site where the event occurred. In other words, removal of the recording apparatus 10 when a predetermined time period or more has elapsed after the occurrence of the event occurs at the time when it can be determined that the removal is not directly related to the event. The predetermined time period is set to, for example, 5 to 10 minutes. Thus, when the owner of the recording apparatus 10 himself/herself removes the recording apparatus 10 after the occurrence of the event, reproduces the event record data in the vicinity of the accident site to show the event record data to the other party, the police or the like, it is possible to prevent or minimize unnecessary transmission of the transmission target information.

The location information transmitted to the external apparatus 20 includes time information corresponding to the location. The external apparatus 20 of a transmission destination can be set in advance by an owner of the recording apparatus 10. An example of the external apparatus 20 may be a mobile phone, a smartphone, or a computer of the owner of the recording apparatus 10, or a server in the cloud.

Here, a case where the event record data is transmitted as the transmission target information will be described. Thus, even if the recording apparatus 10 is taken away by a malicious party or the like, the event record data can be checked by transmitting the event record data to the external apparatus 20. Further, by transmitting the data to a communication apparatus such as a mobile phone or a smartphone of the owner of the vehicle as the external apparatus 20, the owner can immediately reproduce the event record data, and can smoothly check the event record data.

A case where the location information of the recording apparatus 10 is transmitted as the transmission target information will be described. The external apparatus 20 can display the location information of the recording apparatus 10 on a map on a screen based on the received location information of the recording apparatus 10. Then, the external apparatus 20 can receive the location information of the recording apparatus 10 and thus identify the transition of the location information and the current location of the recording apparatus 10 taken away by the malicious party or the like. As a result, a possibility that the recording apparatus 10 taken away can be found becomes high. Further, for example, the police or the like can use the transition of the location information of the recording apparatus 10 to identify the party who has taken away the recording apparatus 10 or vehicle from images of other surveillance cameras in the vicinity of a moving route of the party who has taken away the recording apparatus 10 and dashboard cameras included in other vehicles.

After the recording apparatus 10 is removed from the vehicle and the transmission of the location information to the external apparatus 20 is started, the communication control unit 171 can continue to transmit the location information while the power supply capacity of the internal power supply 145 is a capacity that enables transmission of the location information. Thus, the location information of the recording apparatus 10 taken away by the malicious party can be transmitted for a possible period of time, and the possibility of identifying the party who has taken away the recording apparatus 10 or the vehicle can be further enhanced.

Next, with reference to FIG. 1, each of the components connected to the recording control apparatus 100 will be described. The recording apparatus 10 may include an operation unit 140, a display unit 141, an acceleration sensor 142, a GNSS reception unit 143, a photographing unit 150, a recording unit 160, and a communication unit 170. The recording apparatus 10 may include an internal power supply 145. The recording apparatus 10 is connected to an external power supply via a wired cable (not shown).

The operation unit 140 is a user interface for receiving an operation performed by a user to the recording apparatus 10. The user interface may be, for example, an operation button, or a touch sensor disposed to be superimposed on the display unit 141. The user interface may be a reception unit for infrared or wireless communication, and may receive a signal transmitted from a remote controller or the like. The operation unit 140 supplies operation information, which is information related to the received operation, to the recording control apparatus 100 through a predetermined interface. The operation information is, for example, an instruction to start recording the event or an instruction to reproduce the event record data. In this example, the recording apparatus 10 includes the operation unit 140, but the present disclosure is not limited to this. If the operation unit 140 is a remote controller or the like, the operation unit 140 may be provided outside the recording apparatus 10 as a separate body. In this case, the recording apparatus 10 may include an operation signal reception unit for receiving an operation signal from the operation unit 140 such as a remote controller.

The display unit 141 is a display apparatus which displays various information under the control of the display control unit 126. The display unit 141 has at least a display panel such as a liquid crystal panel or an organic EL (Electro Luminescence). The display unit 141 is connected to the display control unit 126 and displays a signal supplied from the display control unit 126. The display unit 141 displays the images included in the event record data or the like reproduced by the reproduction control unit 124. In this example, the recording apparatus 10 includes the display unit 141, but the present disclosure is not limited to this. The display unit 141 may be provided as a separate body outside the recording apparatus 10.

The acceleration sensor 142 is, for example, a three-axis acceleration sensor, and is installed at any position of the recording apparatus 10. The acceleration sensor 142 detects the acceleration applied to the acceleration sensor 142, and supplies information about the detected acceleration to the recording control apparatus 100. The acceleration sensor 142 is connected to the acceleration information acquisition unit 127, and supplies the information about the detected acceleration to the acceleration information acquisition unit 127. The acceleration sensor 142 may detect acceleration of the X-axis, the Y-axis, and the Z-axis, which are coordinate axes of the 3-axis coordinates.

The GNSS reception unit 143 receives information which identifies the current location of the recording apparatus 10 by, for example, a satellite positioning system called GPS (Global Positioning System). The GNSS reception unit 143 includes an antenna for receiving a GNSS signal. In addition, the GNSS reception unit 143 may additionally include a communication interface for receiving location information acquired by the vehicle. The GNSS reception unit 143 supplies the received signal related to the current location of the recording apparatus 10 to the location information acquisition unit 129.

The internal power supply 145 supplies power for operating the recording apparatus 10 when the supply of external power to the recording apparatus 10 is stopped. For example, the internal power supply 145 is a rechargeable battery or a capacitor for storing power from the external power supply.

The photographing unit 150 is an imaging apparatus including an objective lens, an imaging element, an A-D (Analog-to-Digital) conversion element, and so on. The photographing unit 150 photographs images including sceneries around the vehicle and generates the photographing data, which is data of the photographed images. The photographing unit 150 supplies the generated photographing data to the photographing data acquisition unit 120. The photographing data is recorded in the recording unit 160 in association with the location information from the GNSS reception unit 143. In this example, the recording apparatus 10 includes the photographing unit 150, but the present disclosure is not limited to this. The photographing unit 150 may be provided as a separate body outside the recording apparatus 10. That is, the photographing unit 150 provided outside a main body of the recording apparatus 10 may directly supply the image data to the photographing data acquisition unit 120.

The recording unit 160 is a recording apparatus for storing the photographing data supplied from the photographing unit 150. The recording unit 160 is, for example, a memory card including a flash memory, or a non-volatile recording apparatus such as an SSD (Solid State Drive) or an HDD (Hard Disk Drive). The recording unit 160 is connected to the recording control unit 123, receives predetermined data from the recording control unit 123, and records the received data. The recording unit 160 supplies an event file including the recorded event record data to the reproduction control unit 124 in response to an instruction from the reproduction control unit 124. The recording unit 160 may be attachable to and detachable from the recording apparatus or may not be detachable from the recording apparatus 10. In terms of the purport of the present disclosure, it is more preferable that the recording unit 160 be not easily removable or not removable at all. That is, the recording unit 160 is preferably incorporated into a housing of the recording apparatus 10 (also referred to as a recording and reproduction apparatus with a built-in recording unit).

The communication unit 170 transmits the location information of the recording apparatus 10 to the external apparatus 20 by wireless communication via a wireless network based on an instruction from the communication control unit 171. The communication unit 170 may also receive information about the acceleration detected by a vehicle acceleration sensor (not shown) installed in a vehicle in which the recording apparatus 10 is installed, and output the information to the acceleration information acquisition unit 127. The communication unit 170 may acquire information about the acceleration detected by the vehicle acceleration sensor through wireless communication. The communication unit 170 may acquire the information about the acceleration detected by the vehicle acceleration sensor using, for example, a communication system such as CAN (Controller Area Network) or Ethernet (registered trademark). The communication unit 170 may acquire information about the acceleration detected by the vehicle acceleration sensor through wireless communication, or may acquire the information about the acceleration detected by the vehicle acceleration sensor using, for example, a communication system such as CAN or Ethernet (registered trademark).

Figure 2:
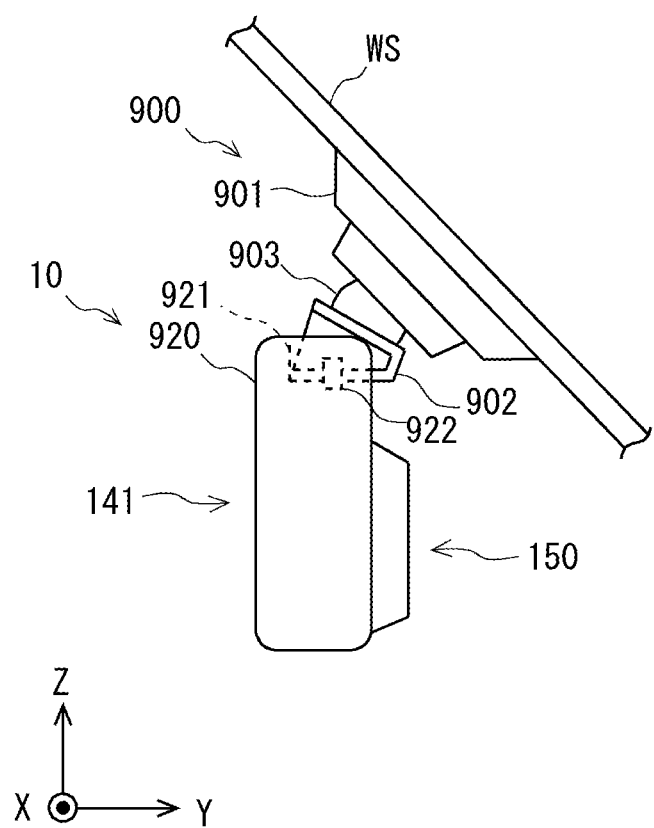
FIG. 2 is a right side view of the recording apparatus according to the first embodiment.
Figure 3:
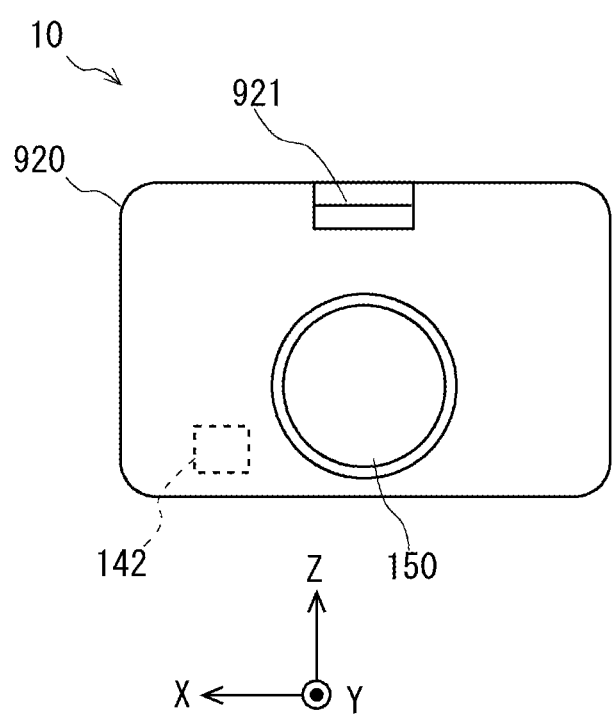
FIG. 3 is a rear view of the recording apparatus according to the first embodiment.
Figure 4:
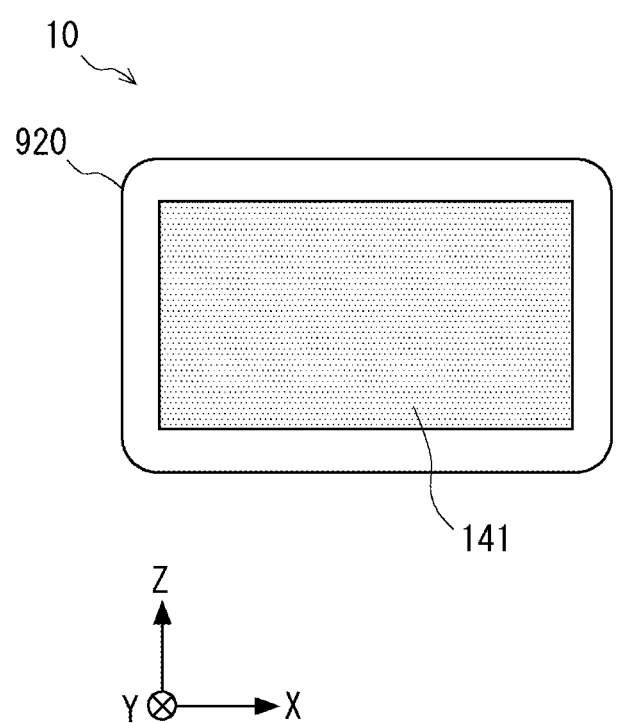
FIG. 4 is a front view of the recording apparatus according to the first embodiment.

Next, a mechanical configuration of the recording apparatus 10 will be described with reference to FIGS. 2 to 4. FIG. 2 is a right side view of the recording apparatus 10 according to the first embodiment. FIG. 3 is a rear view of the recording apparatus 10 according to the first embodiment as seen from a photographing direction. FIG. 4 is a front view of the recording apparatus 10 according to the first embodiment as seen from a display direction. In FIGS. 2 to 4, a right-handed orthogonal coordinate system is provided for convenience in explaining the positional relationship of the components. In the following drawings, when a orthogonal coordinate system is provided, the X-axis, Y-axis, and Z-axis directions of FIGS. 2 to 4 are equal to the X-axis, Y-axis, and Z-axis directions of the orthogonal coordinate system, respectively.

As shown in FIG. 2, the recording apparatus 10 is fixed to a windshield WS of the vehicle with a bracket 900 interposed therebetween. The bracket 900 includes an adhesive unit 901, a holding unit 902, and a ball joint 903.

The adhesive unit 901 is a member for attaching the recording apparatus 10 to a front surface of the vehicle in contact with the windshield WS using an adhesive, double-sided tape, or the like. The bracket 900 is fixed by fixing the adhesive unit 901 to any position of the windshield WS.

The holding unit 902 is attachable to and detachable from the attachment/detachment unit 921 and fits to the attachment/detachment unit 921 so that, while the vehicle is traveling, the recording apparatus 10 does not come off, or a photographing direction deviation doesn't occur. For example, the holding unit 902 has ribs or grooves which are slidable and engageable with the attachment/detachment 921 in a predetermined direction. The recording apparatus 10 is locked and fixed by a locking mechanism (not shown) when the holding unit 902 slides onto a predetermined position in the attachment/detachment unit 921.

The attachment/detachment sensor 922 is provided between an attachment/detachment unit 921 and the holding unit 902 of the recording apparatus 10. The attachment/detachment sensor 922 can detect that the recording apparatus 10 is removed. When the recording apparatus 10 is removed from the holding unit 902 held by the vehicle, the attachment/detachment sensor 922 transmits a signal indicating the removal to a removal detection unit 181, which will be described later.

The ball joint 903 is a joint mechanism provided so that the angle between the adhesive unit 901 and the holding unit 902 can be adjusted, and moves when a predetermined external force is applied. In a state in which the adhesive unit 901 adheres to the windshield WS and the holding unit 902 is fitted to the recording apparatus 10, the ball joint 903 is configured not to move unless a predetermined external force is applied.

A user using the recording apparatus 10 fixes the adhesive unit 901 to the windshield and fits the attachment/detachment unit 921 of the recording apparatus 10 to the holding unit 902. In this way, the recording apparatus 10 is fixed to the vehicle. When the user removes the recording apparatus 10 fixed to the vehicle, the user releases the attachment/detachment unit 921 of the recording apparatus 10 from the holding unit 902. When the attachment/detachment unit 921 is released from the holding unit 902, the user releases a lock mechanism (not shown) and slides the attachment/detachment unit 921 away from the holding unit 902. In this way, the recording apparatus 10 is removed from the vehicle.

A periphery of the recording apparatus 10 is covered with a housing 920 made of resin. In the recording apparatus 10, the display panel included in the display unit 141 is disposed on a front face, an objective lens of the photographing unit 150 is exposed on a rear face, and attachment/detachment unit 921 is provided on an upper surface. Therefore, in the recording apparatus 10, the attachment/detachment unit 921 provided on the upper surface is fitted to the holding unit 902 of the bracket 900, the objective lens of the photographing unit 150 is exposed in a traveling direction of the vehicle, and the display panel of the display unit 141 is disposed to face the driver side. When the recording apparatus 10 is installed in this manner, the recording apparatus 10 photographs images in the traveling direction of the vehicle and displays the photographed images to the driver. The size of the display panel of the recording apparatus 10 is, for example, about 1.5 to 4 inches diagonally. The size of the housing 920 is, for example, about 5 cm to 10 cm in a width direction (X-axis direction).

As shown in FIG. 3, the recording apparatus 10 includes the acceleration sensor 142. Therefore, when the recording apparatus 10 is fixed to the vehicle by the bracket 900, the acceleration sensor 142 detects the acceleration received by the vehicle through the bracket 900. The acceleration sensor 142 detects the acceleration also when the user removes or attaches the recording apparatus 10 from or to the bracket 900, or when the user rocks or pushes the recording apparatus 10.

The bracket 900 described above is an example of mounting the recording apparatus 10 on a vehicle, and the recording apparatus 10 can be mounted on the vehicle or mobile objects in various preferable ways. Further, the sensor for detecting the removal is not limited to the attachment/detachment sensor 922 described above, but may be any preferable sensor provided between the recording apparatus 10 and the mobile object. Such a sensor for detecting the removal can detect that the recording apparatus 10 is removed from the mobile object.

Figure 5:
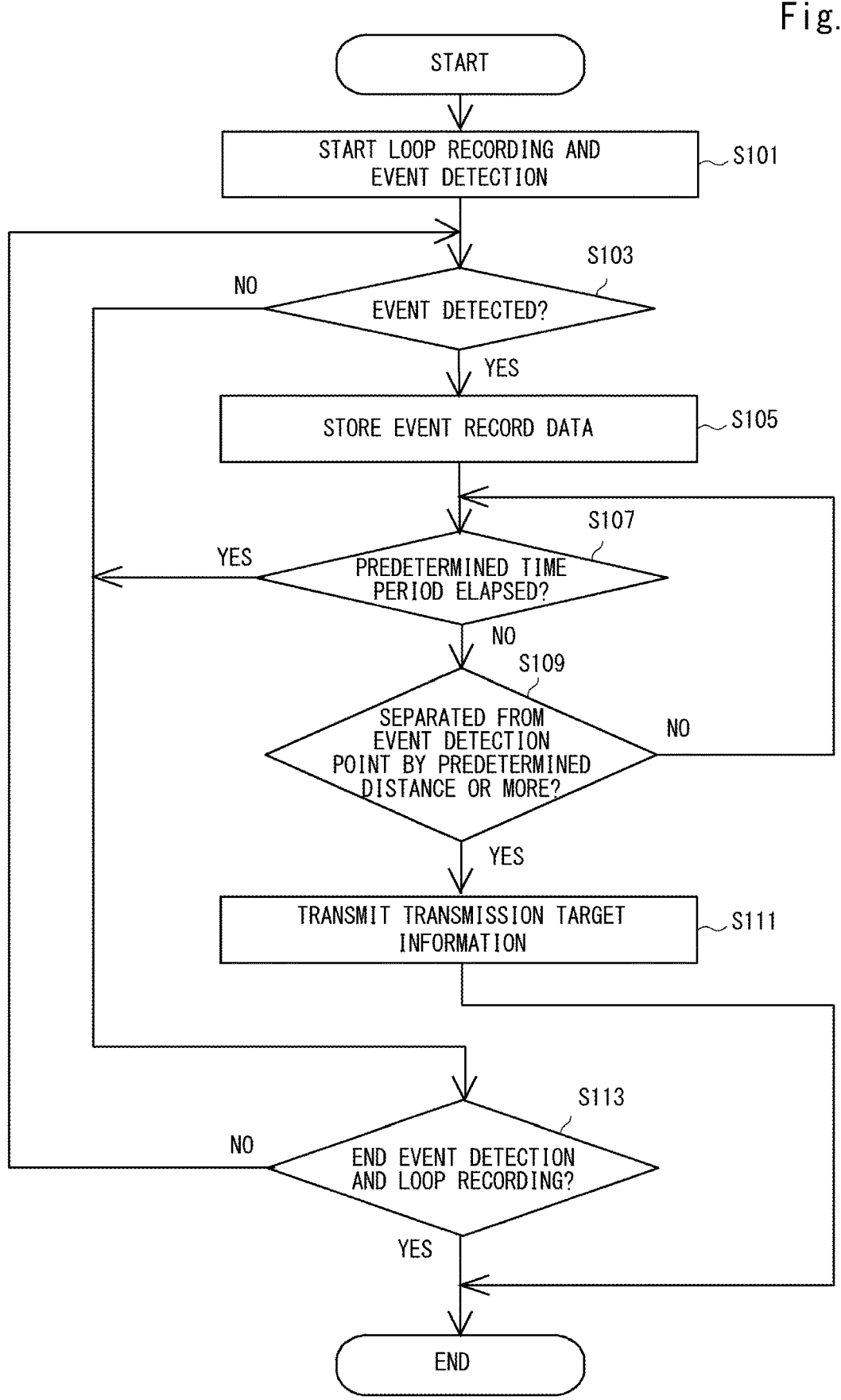
FIG. 5 is a flowchart showing a recording control method executed by the recording control apparatus according to the first embodiment.

FIG. 5 is a flowchart showing a recording control method executed by the recording control apparatus 100 according to the first embodiment. The operation of the recording control apparatus 100 according to the embodiment will be described with reference to FIG. 5.

The recording control apparatus 100 starts a loop recording operation for recording the photographing data in an overwritable manner and an event detection operation (Step S101). When the event detection unit 128 detects an event (YES in Step S103), the recording control unit 123 of the recording control apparatus 100 stores the photographing data for a predetermined time period corresponding to the detected event in the recording unit 160 as the event record data (Step S105). For example, the event detection unit 128 detects an event at the time of an occurrence of acceleration satisfying a condition to be detected as an event, such as a collision accident between a vehicle to which the recording apparatus 10 is attached and another vehicle. The event record data is stored in a format in which overwriting or erasure is prohibited. On the other hand, if it is determined that no event is detected (NO in Step S103), the processing flow transitions to Step S113.

Next, after the event is detected, the recording control apparatus 100 determines whether a predetermined time period has expired, i.e., whether a predetermined time period has elapsed (Step S107). In other words, after the event is detected, the recording control apparatus 100 determines whether the event has occurred within a predetermined time period. If it is determined that the predetermined time period has not elapsed (NO in Step S107), the record control apparatus 100 determines whether the location of the recording apparatus 10 is separated from a location of an event detection point by a predetermined distance or more (S109). That is, the recording control apparatus 100 determines whether the distance between the location of the event detection point and the location of the recording apparatus 10 is more than or equal to the predetermined distance.

The processing of Steps S107 and S109 is for detecting that the distance between the recording apparatus 10 and the vehicle is more than or equal to the predetermined distance within the predetermined time period after the vehicle has stopped due to the occurrence of the event. If the distance between the recording apparatus 10 and the vehicle becomes more than or equal to the predetermined distance within the predetermined time period after the vehicle has stopped due to the occurrence of the event, it is presumed that a party disadvantaged by a check of the event record data has taken away the recording apparatus 10. The processing of Steps S107 and S109 may be performed by any component of the recording control apparatus 100. For example, the processing of Steps S107 and S109 may be performed by the communication control unit 171 of the recording control apparatus 100, but the present disclosure is not limited thereto. This is also true in the other embodiments described below.

If it is determined in Step S109 that the location of the recording apparatus 10 is separated from the location of the event detection point by the predetermined distance or more (YES in Step S109), the communication control unit 171 transmits the transmission target information to the external apparatus 20 (Step S111). When the event record data is transmitted as the transmission target information, even if a malicious party (the other party) takes away the recording apparatus 10, the event record data can be checked using the external apparatus 20. When the location information of the recording apparatus 10 is transmitted as the transmission target information, the location of the main body of the recording apparatus 10 taken away maliciously by the other party can be identified by using the external apparatus 20, and an escape route of the other party can be identified.

On the other hand, if it is not determined in Step S109 that the location of the recording apparatus 10 is separated from the location of the event detection point by the predetermined distance or more (NO in Step S109), the processing flow proceeds to Step S107. After the start of the transmission of the location information of the recording apparatus 10 to the external apparatus in Step S111, the transmission of the location information is continued as long as possible, and this processing is ended. In this case, there is a high possibility that an internal power supply capacity of the recording apparatus 10 is exhausted or the recording apparatus 10 is destroyed or disposed of.

On the other hand, if it is determined in Step S107 that the predetermined time period has elapsed (YES in Step S107), the recording control apparatus 100 determines whether the event detection processing and the loop recording operation are ended (Step S113). YES in Step S107 means that the recording apparatus 10 has not been removed from the vehicle after an event such as an accident has occurred or the recording apparatus 10 has been removed after the predetermined time period has elapsed. In either case, it does not indicate that the other party involved in the event has taken away the recording apparatus 10. If the event detection processing and the loop recording operation are not ended (NO in Step S113), the processing from Step S103 onward is repeated.

Since the recording control apparatus 100 according to the first embodiment is configured as described above, when the recording apparatus is presumed to have been taken away by the other party or the like, the transmission target information can be transmitted to another apparatus. Therefore, it is possible to prevent or minimize unnecessary data transmission such as always transmitting data when an event occurs. Therefore, the recording control apparatus 100 according to the first embodiment can appropriately transmit the location information of the recording apparatus or the event record data to the other apparatus when the recording apparatus has been taken away without transmitting the data unnecessarily.

In the first embodiment, when it is detected that the location of the recording apparatus is separated from the location where the event is detected by the predetermined distance or more within the predetermined time period after the occurrence of the event, it is presumed that the possibility that the recording apparatus 10 has been taken away is extremely high. In this case, the recording control apparatus 100 according to the first embodiment is configured to transmit the transmission target information to another apparatus. Thus, when the recording apparatus 10 is taken away, the transmission target information can be transmitted to the other apparatus without requiring any special configuration. That is, when it is detected that the location of the recording apparatus is separated from the location where the event is detected by the predetermined distance or more within the predetermined time period after the occurrence of the event, it is presumed that the possibility that the recording apparatus 10 has been taken away is extremely high, so that a configuration for detecting the removal of the recording apparatus 10 is unnecessary. Furthermore, the recording control unit 123 can easily record the location information of the event detection point. Therefore, no special configuration is required.

Second Embodiment

Next, a second embodiment will be described. In the second embodiment, the conditions under which the transmission target information is transmitted are different from those in the first embodiment. The configurations of the recording apparatus 10 and the recording control apparatus 100 according to the second embodiment are substantially the same as those according to the first embodiment, and therefore a description thereof will be omitted.

Figure 6:
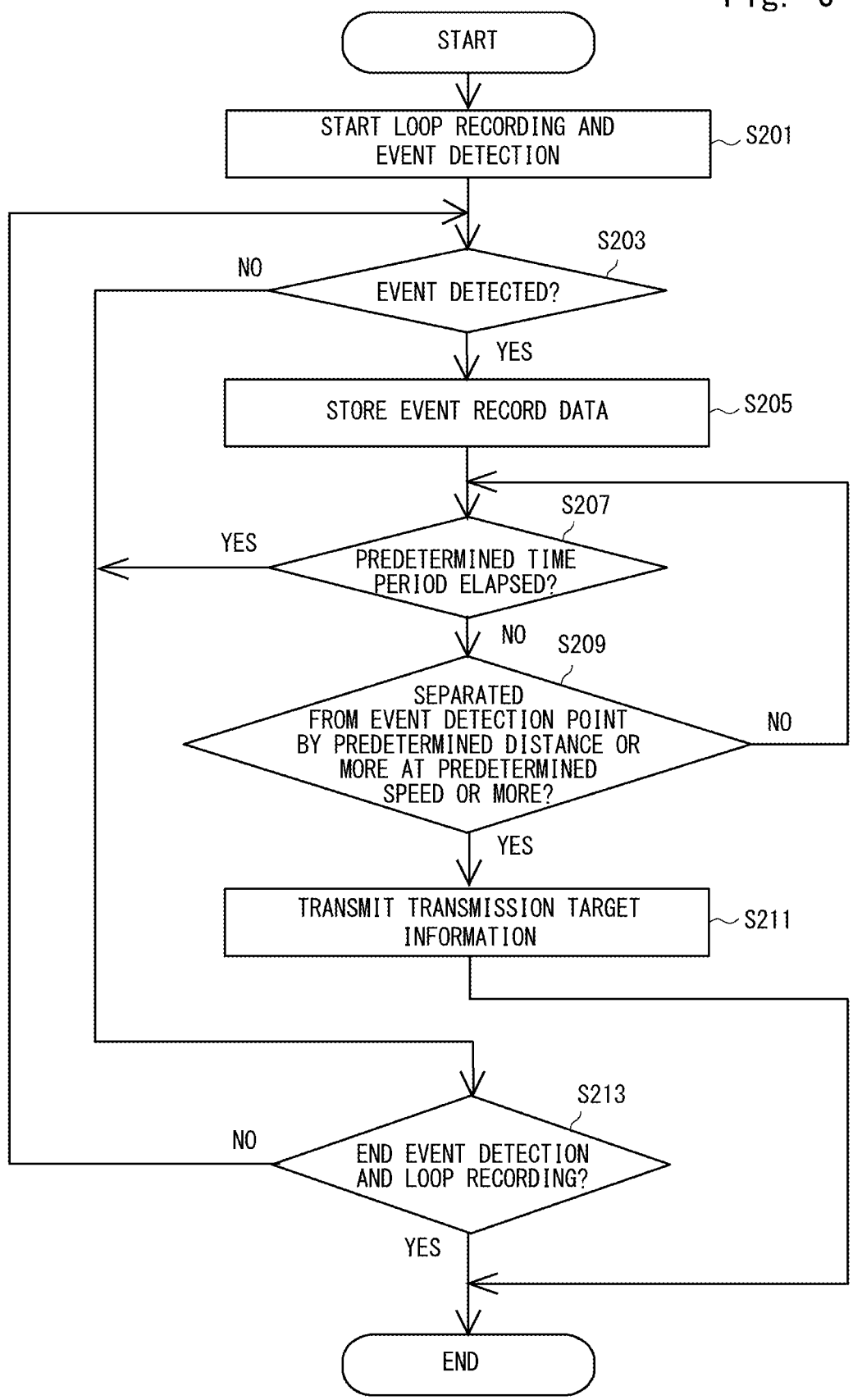
FIG. 6 is a flowchart showing a recording control method executed by a recording control apparatus according to a second embodiment.

FIG. 6 is a flowchart showing a recording control method executed by the recording control apparatus 100 according to the second embodiment. Since the processing of Steps S201 to S207 in the flowchart of FIG. 6 is substantially the same as the processing of Steps S101 to S107 in the flowchart of FIG. 5, description thereof is omitted. Further, since the processing of Steps S211 and S213 in the flowchart of FIG. 6 is substantially the same as the processing of Steps S111 and S113 in the flowchart of FIG. 5, description thereof will be omitted.

If it is determined in Step S207 that the predetermined time period has not elapsed (NO in Step S207), the recording control apparatus 100 determines whether the location of the recording apparatus 10 is separated from the location of the event detection point by a predetermined distance or more at a predetermined speed or more (Step S209). That is, the recording control apparatus 100 determines whether the distance between the location of the event detection point and the location of the recording apparatus 10 is separated by the predetermined distance or more at a speed of the predetermined speed or more within the predetermined time period after the event detection unit 128 detects the event. The processing of Step S209 may be performed by any component of the recording control apparatus 100. For example, the processing of Step S209 may be performed by the communication control unit 171 of the recording control apparatus 100, but the present disclosure is not limited thereto.

Here, the predetermined speed corresponds to the speed at which a malicious party or the like takes away the recording apparatus 10 and escapes with it. Thus, the predetermined speed is faster than a walking speed. For example, it is assumed that the malicious party or the like takes away the recording apparatus 10 and escapes with it in, for example, his or her own vehicle, or escapes without using a vehicle. Therefore, the predetermined speed is preferably set to 10 km/h to 20 km/h or more. Whether or not the location of the recording apparatus 10 has moved at the predetermined speed or more can be determined by detecting the speed of the recording apparatus 10. The speed of the recording apparatus 10 can be calculated from an amount of change in the location information of the recording apparatus 10 with respect to time.

Further, if the speed of the recording apparatus 10 is always more than or equal to the predetermined speed until the recording apparatus 10 is separated from the location of the event detection point by the predetermined distance or more, it may be determined that the recording apparatus 10 is separated from the location of the event detection point by the predetermined distance or more at the predetermined speed or more. Alternatively, if the speed of the recording apparatus 10 is more than or equal to the predetermined speed within a preset period until the recording apparatus 10 is separated from the location of the event detection point by the predetermined distance or more, it may be in this case also determined that the recording apparatus 10 is separated from the location of the event detection point by the predetermined distance or more at the predetermined speed or more. Further alternatively, if the speed of the recording apparatus 10 is more than or equal to the predetermined speed within a preset distance until the recording apparatus 10 is separated from the location of the event detection point by the predetermined distance or more, it may be in this case also determined that the recording apparatus 10 is separated from the location of the event detection point by the predetermined distance or more at the predetermined speed or more. Still further alternatively, if the average speed of the recording apparatus 10 during the period until the recording apparatus 10 is separated from the location of the event detection point by the predetermined distance or more is a predetermined speed or more, it may be in this case also determined that the recording apparatus 10 is separated from the location of the event detection point by the predetermined distance or more at the predetermined speed or more. In still one more alternative, if the highest speed of the recording apparatus 10 during the period until the recording apparatus 10 is separated from the location of the event detection point by the predetermined distance or more is a predetermined speed or more, it may be in this case also determined that the recording apparatus 10 is separated from the location of the event detection point by the predetermined distance or more at the predetermined speed or more. In even one more alternative, if the lowest speed of the recording apparatus 10 during the period until the recording apparatus 10 is separated from the location of the event detection point by the predetermined distance or more is a predetermined speed or more, it may be in this case also determined that the recording apparatus 10 is separated from the location of the event detection point by the predetermined distance or more at the predetermined speed or more.

If it is determined in Step S209 that the location of the recording apparatus 10 is separated from the location of the event detection point by the predetermined distance or more at the predetermined speed or more (YES in Step S209), the communication control unit 171 transmits the transmission target information to the external apparatus 20 (Step S211). That is, when it is detected that the location of the recording apparatus 10 is separated from the location where the event is detected by the predetermined distance or more at the predetermined speed or more within the predetermined time period after the event is detected, the communication control unit 171 performs control for transmitting the transmission target information to the other apparatus. On the other hand, if it is not determined in Step S209 that the location of the recording apparatus 10 is separated from the location of the event detection point by the predetermined distance or more at the predetermined speed or more (NO in Step S209), the processing flow returns to Step S207.

Since the recording control apparatus 100 according to the second embodiment is configured as described above, it is possible to more reliably estimate that a malicious party or the like has taken away the recording apparatus 10 and escaped. That is, in the condition in the first embodiment that the determination about the recording apparatus 10 being taken away only depends on the distance between the location of the recording apparatus 10 and the location where the event is detected, there is a possibility that the transmission target information may be transmitted even in a case where the owner of the recording apparatus 10 removes the recording apparatus 10 and confirms the situation of the accident. On the other hand, if it is determined that the location of the recording apparatus 10 is separated from the location of the event detection point by the predetermined distance or more at the predetermined speed or more, the possibility that the malicious party or the like has taken away the recording apparatus 10 and escaped is extremely high. Therefore, in the second embodiment, it is possible to further prevent or minimize unnecessary transmission of data.

Third Embodiment

Next, a third embodiment will be described. In the third embodiment, the conditions under which the transmission target information is transmitted are different from those according to other embodiments. In the following description, the same components as those in the first embodiment are denoted by the same reference signs as those in FIG. 1, and the description thereof will be omitted as appropriate.

Figure 7:
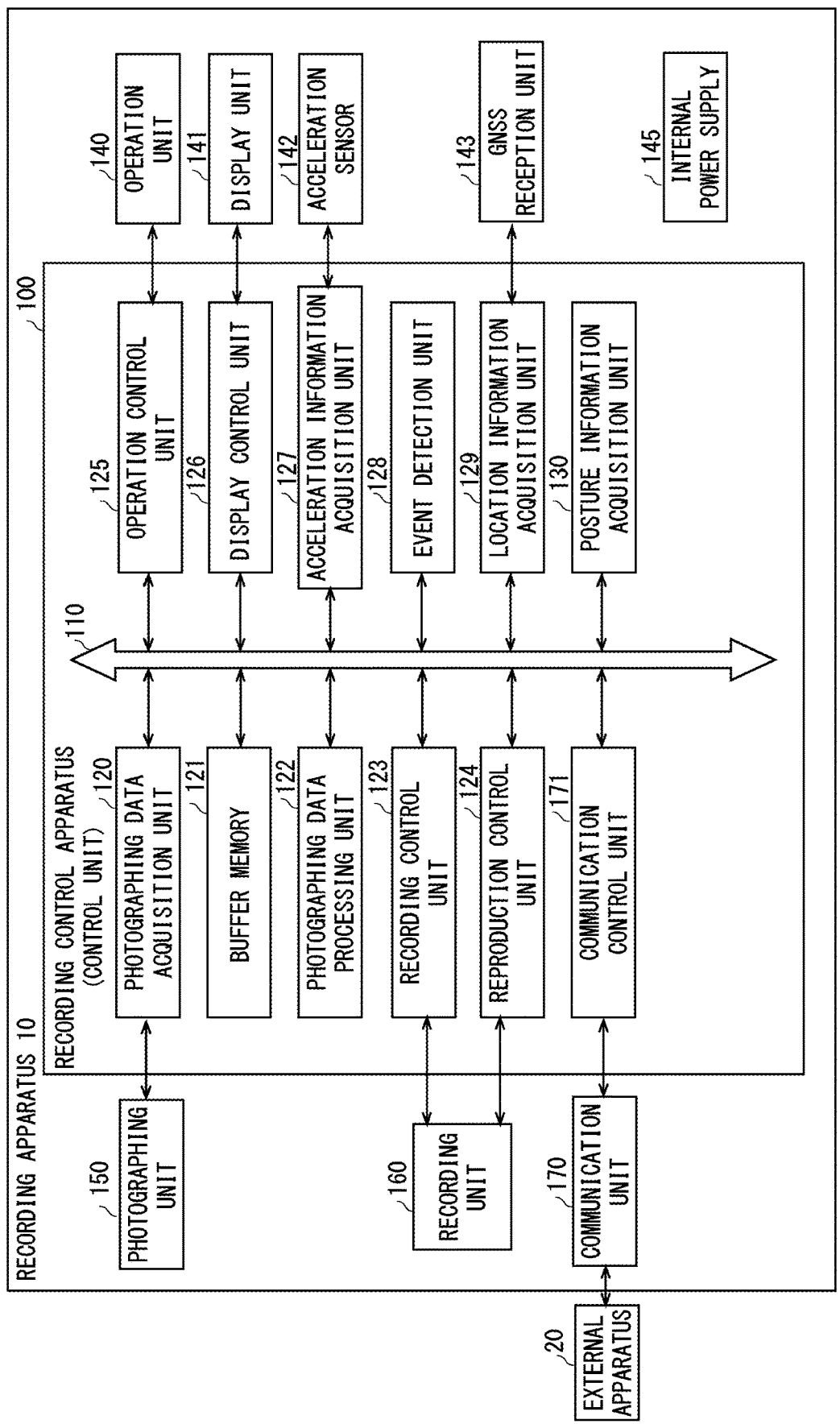
FIG. 7 is a block diagram showing a configuration of a recording apparatus including a recording control apparatus according to a third embodiment.

FIG. 7 is a block diagram showing a configuration of a recording apparatus 10 including a recording control apparatus 100 according to the third embodiment. The recording control apparatus 100 according to the third embodiment differs from the recording control apparatus 100 according to the first embodiment in that the recording control apparatus 100 according to the third embodiment further includes a posture information acquisition unit 130. The components other than the posture information acquisition unit 130 are substantially the same as those according to the first embodiment, and therefore description thereof will be omitted.

The posture information acquisition unit 130 acquires posture information indicating a posture of the recording apparatus 10. Specifically, for example, the posture information acquisition unit 130 acquires the posture information of the recording apparatus 10 by using information from the acceleration sensor 142, which is a 3-axis acceleration sensor. Here, the acceleration sensor 142 may be adjusted to detect vertical downward (−Z direction in the coordinate system of FIGS. 2 and 3) gravitational acceleration when the recording apparatus 10 is installed in the vehicle. Therefore, when the recording apparatus 10 is installed in the vehicle, the acceleration sensor 142 detects that the acceleration is applied in the direction set in the −Z direction. When the recording apparatus 10 is installed in the vehicle, for example, the posture of the recording apparatus 10 is substantially constant. Thus, when the acceleration sensor 142 detects the acceleration in the direction set in the −Z direction, the posture information acquisition unit 130 can acquire the posture information indicating the posture when the recording apparatus 10 is installed in the vehicle. Alternatively, when the recording apparatus 10 is provided with a posture sensor such as a gyro sensor or a motion sensor, the posture information acquisition unit 130 may acquire the posture information from such a posture sensor.

If the recording apparatus 10 is removed from the vehicle, the posture of the recording apparatus 10 may not be constant. Even in this case, the acceleration sensor 142 can detect the gravitational acceleration in the direction corresponding to the vertical downward direction. On the other hand, since the posture of the recording apparatus 10 may be different from the posture of the recording apparatus 10 installed in the vehicle, the −Z direction set in the acceleration sensor 142 may be different from the vertical downward direction.

For example, in a posture in which a lower surface of the recording apparatus 10 in FIG. 3 is in the upward direction after the recording apparatus 10 is removed, the +Z direction set in the acceleration sensor 142 corresponds to the vertical downward direction, and thus the acceleration sensor 142 detects the acceleration in the +Z direction. In the posture in which a left surface of the recording apparatus 10 in FIG. 3 is in the downward direction, the +X direction set in the acceleration sensor 142 corresponds to the vertical downward direction, and thus the acceleration sensor 142 detects the acceleration in the +X direction. Furthermore, in the posture in which the surface of the photographing unit 150 of the recording apparatus 10 in FIG. 2 on the side of the objective lens is in the downward direction, the +Y direction set in the acceleration sensor 142 corresponds to the vertical downward direction, and thus the acceleration sensor 142 detects the acceleration in the +Y direction. Further, in the posture in which the surface of the recording apparatus 10 on the display panel side of the display unit 141 in FIG. 2 is in the downward direction, the −Y direction set in the acceleration sensor 142 corresponds to the vertical downward direction, and thus the acceleration sensor 142 detects the acceleration in the −Y direction. Therefore, the posture information acquisition unit 130 can acquire (detect) the posture of the recording apparatus 10 from the direction of acceleration detected by the acceleration sensor 142.

Figure 8:
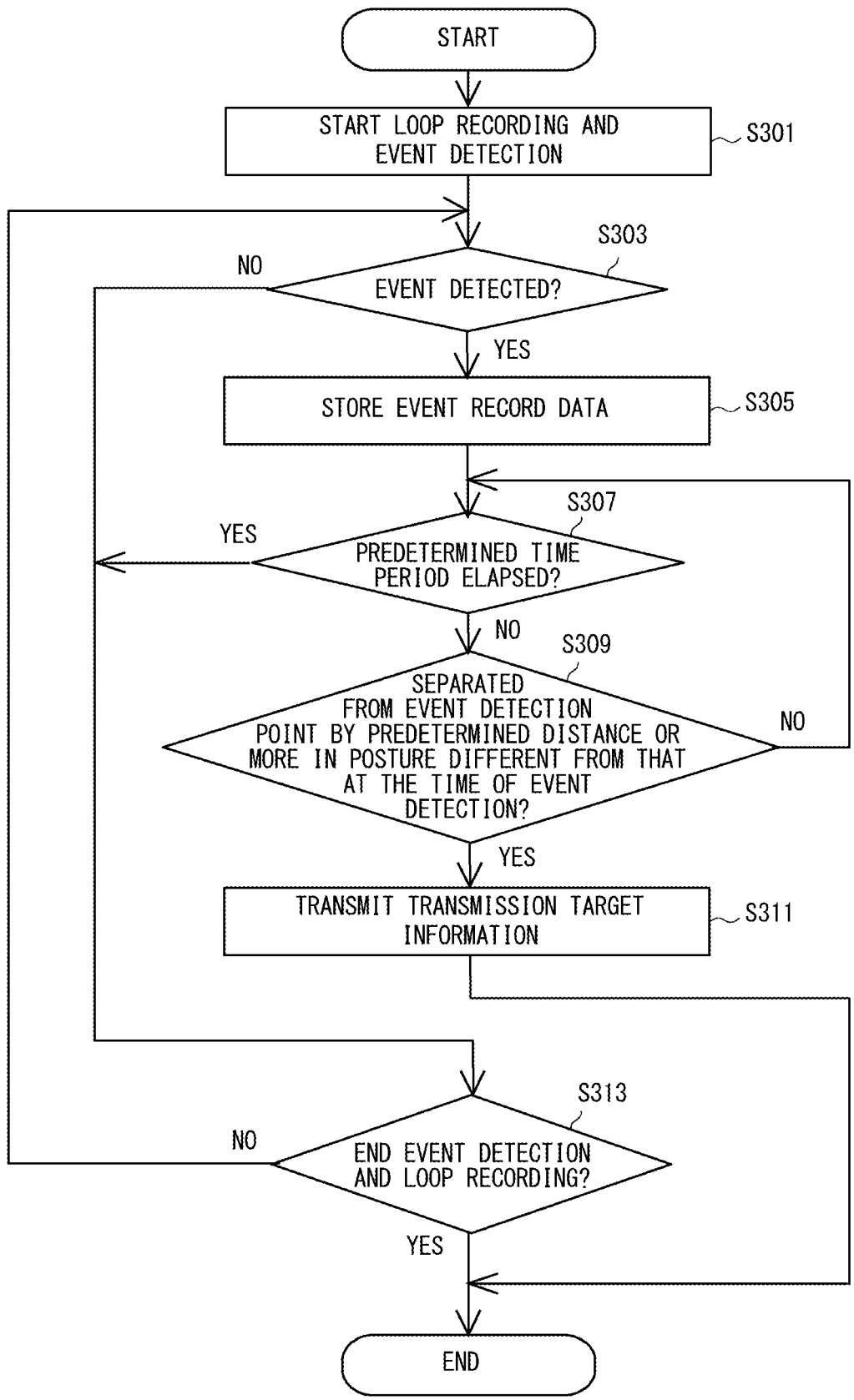
FIG. 8 is a flowchart showing a record control method executed by the recording control apparatus according to the third embodiment.

FIG. 8 is a flowchart showing a recording control method executed by the recording control apparatus 100 according to the third embodiment. Since the processing of Steps S301 to S307 in the flowchart of FIG. 8 is substantially the same as the processing of Steps S101 to S107 in the flowchart of FIG. 5, description thereof will be omitted. Further, since the processing of Steps S311 and S313 in the flowchart of FIG. 8 is substantially the same as the processing of Steps S111 and S113 in the flowchart of FIG. 5, description thereof will be omitted.

If it is determined in Step S307 that the predetermined time period has not elapsed (NO in Step S307), the recording control apparatus 100 determines whether the recording apparatus 10 is separated from the event detection point by the predetermined distance or more in a posture different from that at the time of event detection (Step S309). That is, within the predetermined time period after the event detection unit 128 detects the event, the recording control apparatus 100 determines whether the recording apparatus 10 is separated from the location at which the event is detected by the predetermined distance or more in a posture different from that at the time of event detection.

Specifically, the recording control apparatus 100 uses the posture information acquired by the posture information acquisition unit 130 to determine whether the posture of the recording apparatus 10 is different from the posture at the time of event detection within the predetermined time period after the event detection unit 128 detects the event. Next, the recording control apparatus 100 determines whether the location of the recording apparatus 10 is separated from the location of the event detection point by the predetermined distance or more with the posture of the recording apparatus 10 different from the posture at the time of event detection. The processing of Step S309 may be performed by any component of the recording control apparatus 100. For example, the processing of Step S309 may be performed by the communication control unit 171 of the recording control apparatus 100, but the present disclosure is not limited thereto.

Here, when the malicious party or the like takes away the recording apparatus 10 and escapes with it, the posture of the recording apparatus 10 is extremely unlikely to be the posture when the recording apparatus 10 is installed in the vehicle (i.e., the posture of the recording apparatus 10 when the event is detected). That is, when the malicious party or the like takes away the recording apparatus 10 and escapes with it, it is extremely unlikely that the posture of the recording apparatus 10 is such that the lower surface of the recording apparatus 10 in FIG. 3 is maintained in the downward direction. Therefore, when the malicious party or the like takes away the recording apparatus 10 and escapes with it, the acceleration sensor 142 can detect the acceleration in a direction other than the −Z direction. For example, when the malicious party or the like escapes in a vehicle, the recording apparatus 10 may be left on a vehicle seat. In this state, since the recording apparatus 10 may be left in an inclined state, the acceleration sensor 142 can detect, for example, the acceleration in the −Y direction, the −X direction, or the +Y direction. Therefore, when the recording apparatus 10 is separated from the location where the event is detected by the predetermined distance or more in a posture different from the posture at the time of event detection within the predetermined time period after the event is detected, it can be presumed that the malicious party or the like has taken away the recording apparatus 10 and escaped. When the difference (a magnitude of a difference vector) between the acceleration (acceleration vector) detected by the acceleration sensor 142 and the acceleration (acceleration vector) in the −Y direction is larger than a preset value, it may be determined that the posture of the recording apparatus 10 is different from the posture at the time of event detection.

When the recording apparatus 10 is always in a posture different from that at the time of the event detection until the recording apparatus is separated from the location of the event detection point by the predetermined distance or more, it may be determined that the recording apparatus 10 is separated from the location of the event detection point by the predetermined distance or more in a posture different from that at the time of event detection. Alternatively, if the posture of the recording apparatus 10 is different from that at the time of event detection within a preset period until the recording apparatus 10 is separated from the location of the event detection point by the predetermined distance or more, it may be in this case also determined that the recording apparatus 10 is separated from the location of the event detection point by the predetermined distance or more in a posture different from that at the time of event detection. Further alternatively, if the posture of the recording apparatus 10 is different from that at the time of the event detection within a preset distance until the recording apparatus 10 is separated from the location of the event detection point by the predetermined distance or more, it may be in this case also determined that the recording apparatus 10 is separated from the location of the event detection point by the predetermined distance or more in a posture different from that at the time of event detection.

If it is determined in Step S309 that the recording apparatus 10 is separated from the location of the event detection point by the predetermined distance or more in a posture different from that at the time of event detection (YES in Step S309), the communication control unit 171 transmits the transmission target information to the external apparatus 20 (Step S311). That is, when it is detected that the location of the recording apparatus 10 is separated from the location where the event is detected, in a posture different from that at the time of the event detection, by the predetermined distance or more within the predetermined time period after the event is detected, the communication control unit 171 performs control for transmitting the transmission target information to the other apparatus. On the other hand, if it is not determined in Step S309 that the location of the recording apparatus 10 is separated from the location of the event detection point, in a posture different from that at the time of event detection, by the predetermined distance or more (NO in Step S309), the processing flow returns to Step S307.

Since the recording control apparatus 100 according to the third embodiment is configured as described above, it is possible to more reliably estimate that a malicious party or the like has taken away the recording apparatus 10 and escaped. That is, in the condition in the first embodiment that the determination about the recording apparatus 10 being taken away only depends on the distance between the location of the recording apparatus 10 and the location where the event is detected, there is a possibility that the transmission target information may be transmitted even in a case where the owner of the recording apparatus 10 removes the recording apparatus 10 and confirms the situation of the accident. On the other hand, if it is determined that the location of the recording apparatus 10 is separated from the location of the event detection point, in a posture different from that at the time of event detection, by the predetermined distance or more at the predetermined speed or more, the possibility that the malicious party or the like has taken away the recording apparatus 10 and escaped is extremely high. Therefore, in the third embodiment, it is possible to further prevent or minimize unnecessary transmission of data.

Fourth Embodiment

Next, a fourth embodiment will be described. In the fourth embodiment, the conditions under which the transmission target information is transmitted are different from those according to other embodiments. The configurations of the recording apparatus 10 and the recording control apparatus 100 according to the fourth embodiment are substantially the same as those according to the third embodiment, and therefore a description thereof will be omitted.

Figure 9:
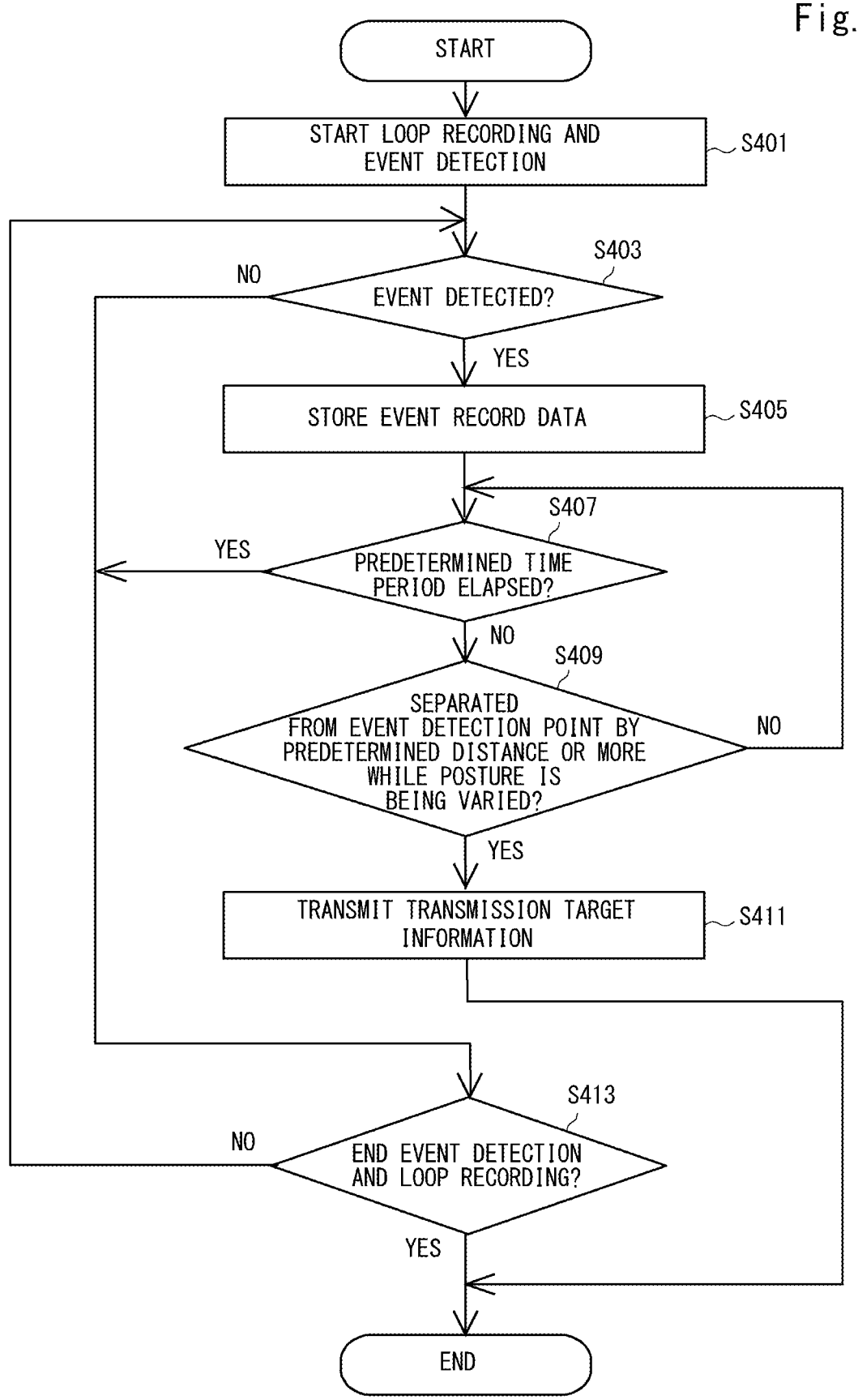
FIG. 9 is a flowchart showing a recording control method executed by a recording control apparatus according to a fourth embodiment.

FIG. 9 is a flowchart showing a recording control method executed by the recording control apparatus 100 according to the fourth embodiment. Since the processing of Steps S401 to S407 in the flowchart of FIG. 9 is substantially the same as the processing of Steps S101 to S107 in the flowchart of FIG. 5, description thereof will be omitted. Further, since the processing of Steps S411 and S413 in the flowchart of FIG. 9 is substantially the same as the processing of Steps S111 and S113 in the flowchart of FIG. 5, description thereof will be omitted.

If it is determined in Step S407 that the predetermined time period has not elapsed (NO in Step S407), the recording control apparatus 100 determines whether the location of the recording apparatus 10 is separated from the location of the event detection point by a predetermined distance or more while the posture of the recording apparatus 10 is being varied (Step S409). That is, the recording control apparatus 100 determines whether the distance between the location of the event detection point and the location of the recording apparatus 10 is more than or equal to the predetermined distance while the posture of the recording apparatus 10 is being varied within the predetermined time period after the event detection unit 128 detects the event.

Specifically, the recording control apparatus 100 uses the posture information acquired by the posture information acquisition unit 130 to determine whether the posture of the recording apparatus 10 is varied within the predetermined time period after the event detection unit 128 detects the event. For example, the recording control apparatus 100 may determine that the posture of the recording apparatus 10 has been changed when an amount of variation in the posture of the recording apparatus 10 is larger than a preset value. The amount of variation in the posture of the recording apparatus 10 can be calculated from an amount of variation in the posture information (acceleration) of the recording apparatus 10 with respect to time.

The recording control apparatus 100 determines whether the location of the recording apparatus 10 is separated from the location of the event detection point by the predetermined distance or more while the posture of the recording apparatus 10 is being varied. The processing of Step S409 may be performed by any component of the recording control apparatus 100. For example, the processing of Step S409 may be performed by the communication control unit 171 of the recording control apparatus 100, but the present disclosure is not limited thereto.

Here, when a malicious party or the like takes away the recording apparatus 10 and escapes with it, the posture of the recording apparatus 10 may be varied. That is, when the malicious party or the like takes away the recording apparatus 10 and escapes with it, it is extremely unlikely that the posture of the recording apparatus 10 is such that the lower surface of the recording apparatus 10 in FIG. 3 is maintained in the downward direction. Then, for example, when the malicious party or the like runs and escapes, the malicious party or the like may escape while holding the recording apparatus 10 in his/her hand. In this state, the acceleration (gravitational acceleration) detected by the acceleration sensor 142 may be varied periodically in response to a running motion. Therefore, if the location of the recording apparatus 10 is separated from the location where the event is detected by the predetermined distance or more while the posture of the recording apparatus 10 is being varied within the predetermined time period after the event is detected, it can be presumed that the malicious party or the like has taken away the recording apparatus 10 and escaped with it.

Further, if the posture of the recording apparatus 10 is always varied until the storage apparatus 10 is separated from the location of the event detection point by the predetermined distance or more, it may be determined that the recording apparatus 10 is separated from the location of the event detection point while the posture is being varied. Alternatively, if the posture of the recording apparatus 10 is varied within a preset period until the recording apparatus 10 is separated from the location of the event detection point by the predetermined distance or more, it may be in this case also determined that the recording apparatus 10 is separated from the location of the event detection point by the predetermined distance or more while the posture is being varied. Further alternatively, if the posture of the recording apparatus 10 is varied within a preset distance until the recording apparatus 10 is separated from the location of the event detection point by the predetermined distance or more, it may be in this case also determined that the recording apparatus 10 is separated from the location of the event detection point by the predetermined distance or more while the posture is being varied. Still further alternatively, if the average value of the amount of variation of the posture of the recording apparatus 10 is greater than a predetermined value until the recording apparatus 10 is separated from the location of the event detection point by the predetermined distance or more, it may be in this case also determined that the recording apparatus 10 is separated from the location of the event detection point by the predetermined distance or more while the posture is being varied. In still one more alternative, if a maximum value of the amount of variation of the posture of the recording apparatus 10 is greater than a predetermined value until the storage apparatus 10 is separated from the location of the event detection point by the predetermined distance or more, it may be in this case also determined that the recording apparatus 10 has left the location of the event detection point by the predetermined distance or more while the posture is being varied. In even one more alternative, if a minimum value of the amount of variation of the posture of the recording apparatus 10 is greater than a predetermined value until the storage apparatus 10 is separated from the location of the event detection point by the predetermined distance or more, it may be in this case also determined that the recording apparatus 10 has left the location of the event detection point by the predetermined distance or more while the posture is being varied.

If it is determined in Step S409 that the location of the recording apparatus 10 is separated from the location of the event detection point by the predetermined distance or more while the posture of the recording apparatus 10 is being varied (YES in Step S409), the communication control unit 171 transmits the transmission target information to the external apparatus 20 (Step S411). That is, when the location of the recording apparatus 10 is detected to be more than a predetermined distance away from the location where the event is detected while the posture of the recording apparatus 10 is being varied within a predetermined time period after the event is detected, the communication control unit 171 performs control for transmitting the transmission target information to another apparatus. On the other hand, if it is not determined in Step S409 that the location of the recording apparatus 10 is separated from the location of the event detection point by the predetermined distance or more while the posture of the recording apparatus 10 is being varied (NO in Step S409), the processing flow returns to Step S407.

Since the recording control apparatus 100 according to the fourth embodiment is configured as described above, it is possible to more reliably estimate that a malicious party or the like has taken away the recording apparatus 10 and escaped. That is, in the condition in the first embodiment that the determination about the recording apparatus 10 being taken away only depends on the distance between the location of the recording apparatus 10 and the location where the event is detected, there is a possibility that the transmission target information may be transmitted even in a case where the owner of the recording apparatus 10 removes the recording apparatus 10 and confirms the situation of the accident. On the other hand, if it is determined that the location of the recording apparatus 10 is separated from the location of the event detection point by the predetermined distance or more while changing the posture, the possibility that the malicious party or the like has taken away the recording apparatus 10 and escaped is extremely high. Therefore, in the fourth embodiment, it is possible to further prevent or minimize unnecessary transmission of data.

Fifth Embodiment

Next, a fifth embodiment will be described. The fifth embodiment differs from other embodiments in that location information of the recording apparatus 10 or event record data stored in the recording unit 160 is selectively transmitted based on a power amount of the internal power supply 145. In the following description, the same components as those according to the first embodiment are denoted by the same reference signs as those in FIG. 1, and the description thereof will be omitted as appropriate.

Figure 10:
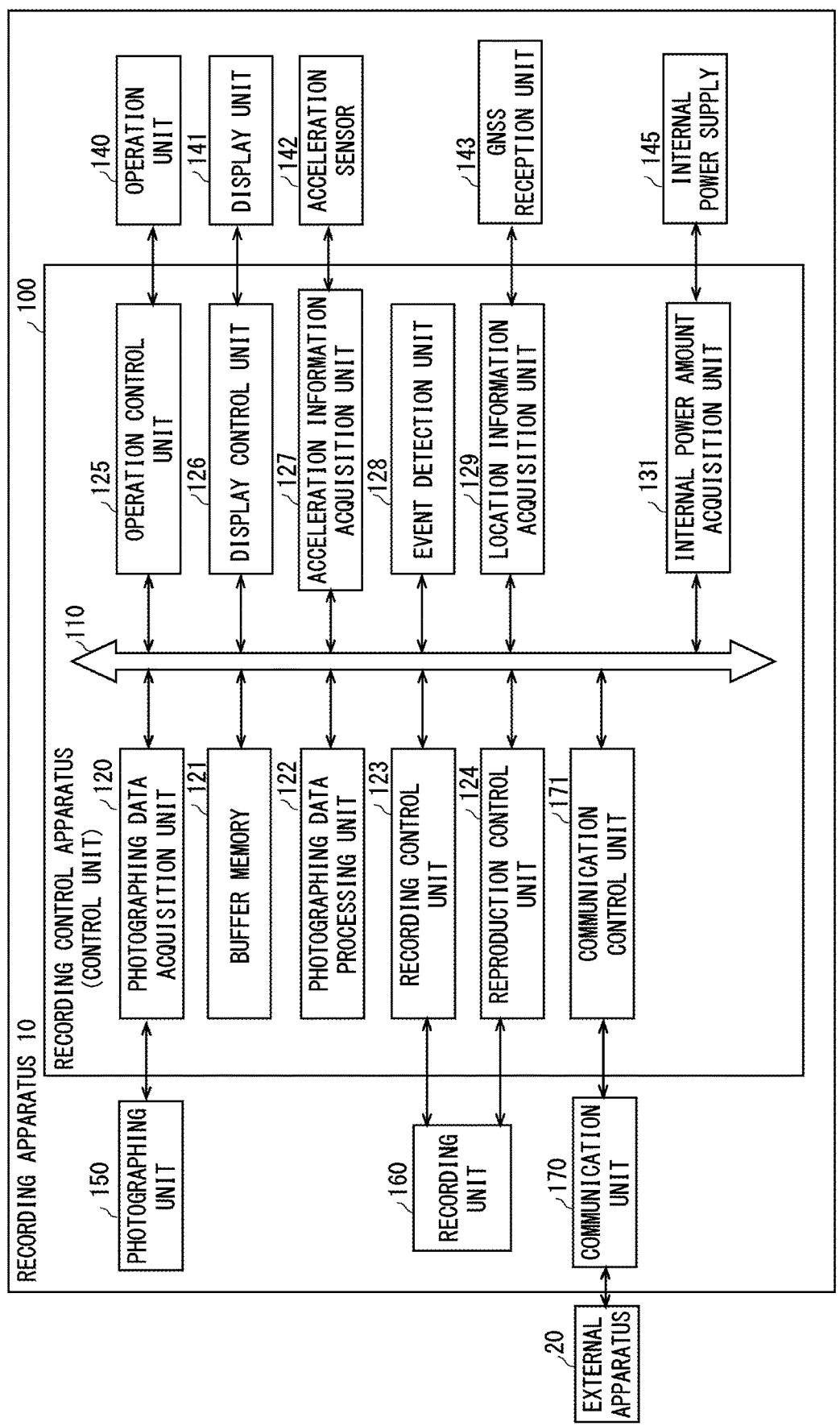
FIG. 10 is a block diagram showing a configuration of a recording apparatus including a recording control apparatus according to a fifth embodiment.

FIG. 10 is a block diagram showing a configuration of a recording apparatus 10 including a recording control apparatus 100 according to the fifth embodiment. The recording control apparatus 100 according to the fifth embodiment is different from the recording control apparatus 100 according to the first embodiment in that the recording control apparatus 100 according to the fifth embodiment further includes an internal power amount acquisition unit 131. The components other than the internal power amount acquisition unit 131 are substantially the same as those according to the first embodiment, and therefore description thereof will be omitted. The internal power amount acquisition unit 131 acquires a power amount of the internal power supply 145 of the recording apparatus 10. Specifically, the internal power amount acquisition unit 131 accesses the internal power supply 145 of the recording apparatus 10 to acquire a value indicating the power amount of the internal power supply 145.

Figure 11:
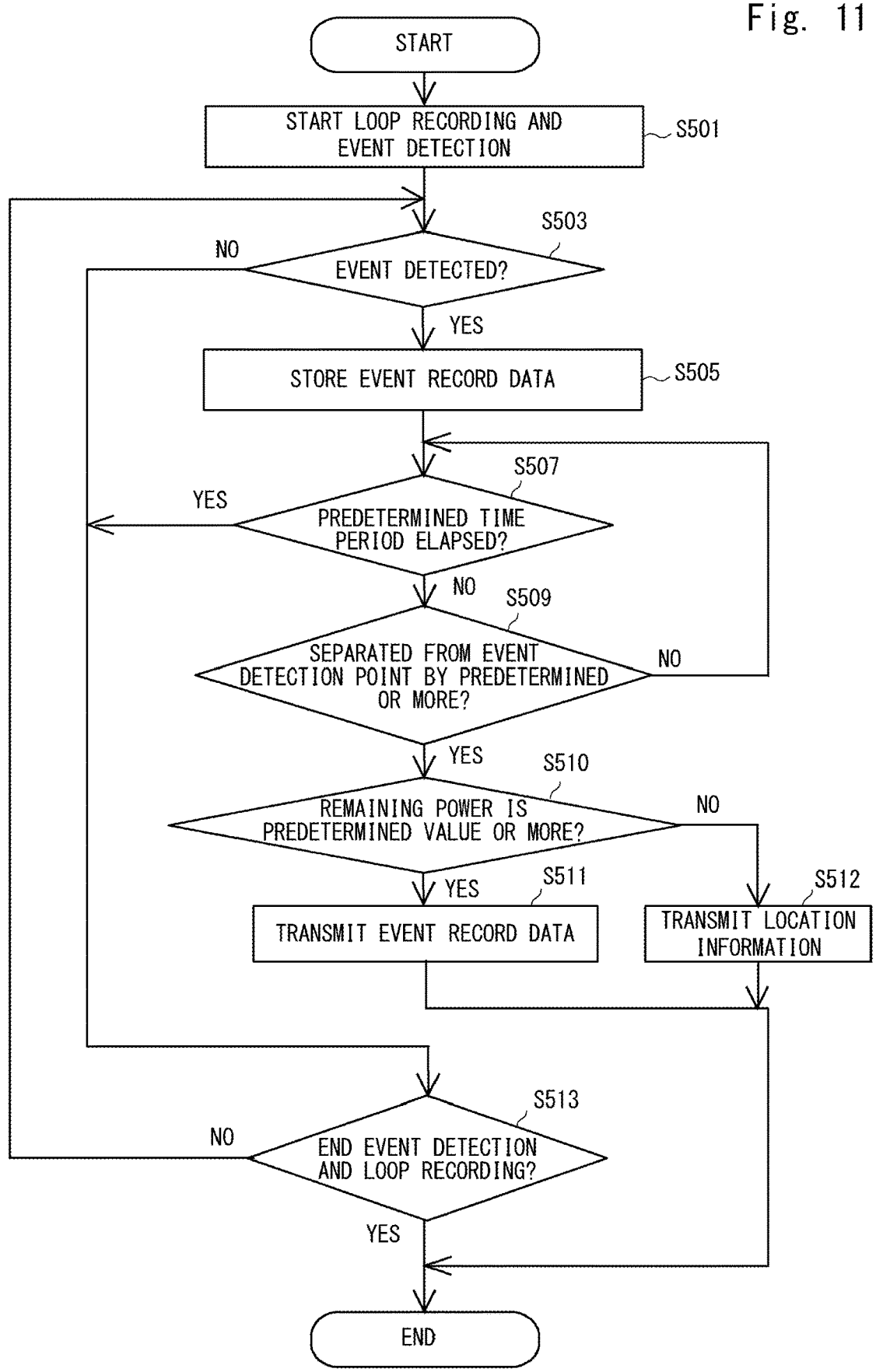
FIG. 11 is a flowchart showing a recording control method executed by the recording control apparatus according to the fifth embodiment.

FIG. 11 is a flowchart showing a recording control method executed by the recording control apparatus 100 according to the fifth embodiment. Since the processing of Steps S501 to S509 in the flowchart of FIG. 11 is substantially the same as the processing of Steps S101 to S109 in the flowchart of FIG. 5, description thereof is omitted. Since the processing of Step S513 in the flowchart of FIG. 11 is substantially the same as the processing of Step S113 in the flowchart of FIG. 5, description thereof will be omitted. The processing of Steps S510 to S512 described below may be performed by any component of the recording control apparatus 100. For example, the processing from Step S510 to Step S512 may be performed by the communication control apparatus 171 of the recording control apparatus 100, but the present disclosure is not limited thereto.

If it is determined in Step S509 that the location of the recording apparatus 10 is separated from the location of the event detection point by the predetermined distance or more within the predetermined time period after the event is detected (YES in Step S509), the recording control apparatus 100 selects which piece of the transmission target information is to be transmitted. Next, the recording control apparatus 100 determines whether the remaining power of the internal power supply 145 is equal to or greater than a predetermined value (Step S510). Specifically, the recording control apparatus 100 determines whether the power amount acquired by the internal power amount acquisition unit 131 is more than or equal to the predetermined value.

If it is determined in Step S510 that the remaining power of the internal power supply 145 is more than or equal to the predetermined value (YES in Step S510), the communication control unit 171 performs control to transmit the event record data (Step S511). In the processing of Step S511, the location information of the recording apparatus 10 may be transmitted in addition to the event record data. On the other hand, if it is determined that the remaining power of the internal power supply 145 is not more than or equal to the predetermined value (NO in Step S510), the communication control unit 171 performs control to transmit the location information of the recording apparatus 10 (Step S512). That is, the communication control unit 171 performs control for selectively transmitting the location information of the recording apparatus 10 or the event record data stored in the recording unit 160 to another apparatus based on the power amount of the internal power supply 145.

Here, the predetermined value of the remaining power is, for example, a lowest value of the power that enables transmission of the event record data. Therefore, when the remaining power of the internal power supply 145 is more than or equal to the predetermined value, the event record data is transmitted to the external apparatus 20 such as the smartphone of the owner of the vehicle, so that the owner can smoothly check the event record data. On the other hand, when the remaining power of the internal power supply 145 is less than the predetermined value, at least the location information of the recording apparatus 10 is transmitted to the external apparatus 20. Thus, the transition of the location information of the recording apparatus 10 taken away by the malicious party or the like and the current location of the recording apparatus 10 can be identified. Then, the possibility in which the recording apparatus 10 can be found increases, and the party who has taken away the recording apparatus 10 or the vehicle can be identified.

Sixth Embodiment

Next, a sixth embodiment will be described. The sixth embodiment differs from other embodiments in that removal of a recording apparatus 10 is detected. In the following description, the same components as those according to the first embodiment are denoted by the same reference signs as those in FIG. 1, and the description thereof will be omitted as appropriate.

Figure 12:
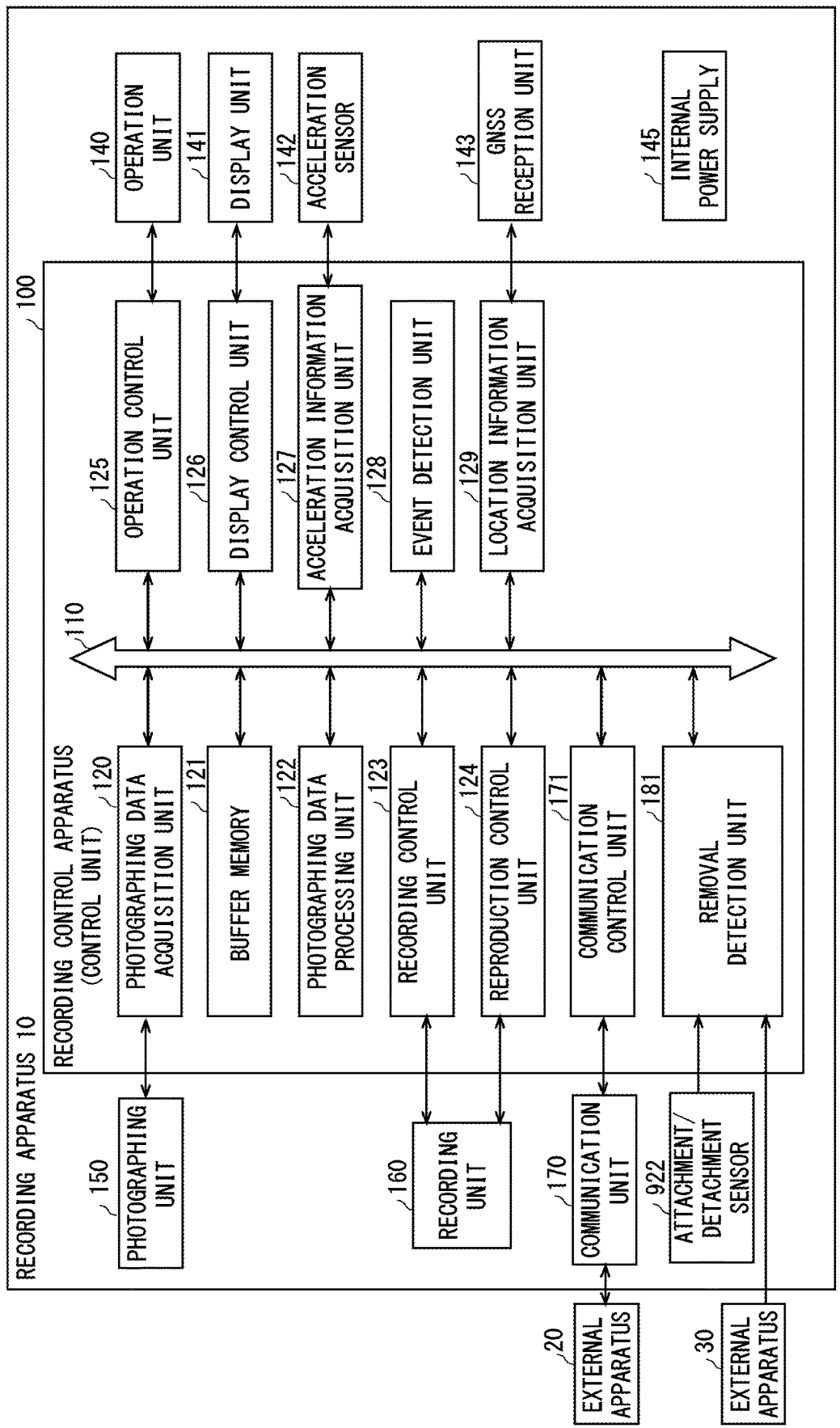
FIG. 12 is a block diagram showing a configuration of a recording apparatus including a recording control apparatus according to a sixth embodiment.

FIG. 12 is a block diagram showing a configuration of the recording apparatus 10 including the recording control apparatus 100 according to the sixth embodiment. The recording control apparatus 100 according to the sixth embodiment is different from the recording control apparatus 100 according to the first embodiment in that the recording control apparatus 100 according to this embodiment further includes a removal detection unit 181. The components other than the removal detection unit 181 are substantially the same as those according to the first embodiment, and therefore description thereof will be omitted.

The removal detection unit 181 detects removal of the recording apparatus 10 from the vehicle by receiving a signal indicating the removal of the recording apparatus 10 from the vehicle. The recording apparatus 10 is connected to a power supply (an external power supply 30) of the vehicle through a wired cable. When the wired cable is unplugged, the removal detection unit 181 acquires a signal indicating that the external power supply 30 is disconnected. That is, the removal detection unit 181 may detect the removal from the vehicle based on the signal indicating that the external power supply 30 supplied from the vehicle to the recording apparatus 10 is disconnected. Alternatively, the removal detection unit 181 may receive a signal indicating that the recording apparatus 10 is removed from the vehicle from an attachment/detachment sensor 922 (described above in FIG. 2) provided in an attachment/detachment unit 921 of the recording apparatus 10. Further, the removal detection unit 181 may determine that the recording apparatus 10 is removed from the vehicle when a distance indicated by the location information of the recording apparatus 10 acquired by the location information acquisition unit 129 provided in the recording apparatus 10 and a location at which the vehicle has stopped is equal to or greater than a second predetermined distance. The second predetermined distance may be set to any distance, for example, 2 m to 5 m, where the recording apparatus 10 is considered to have been removed from the vehicle.

Figure 13:
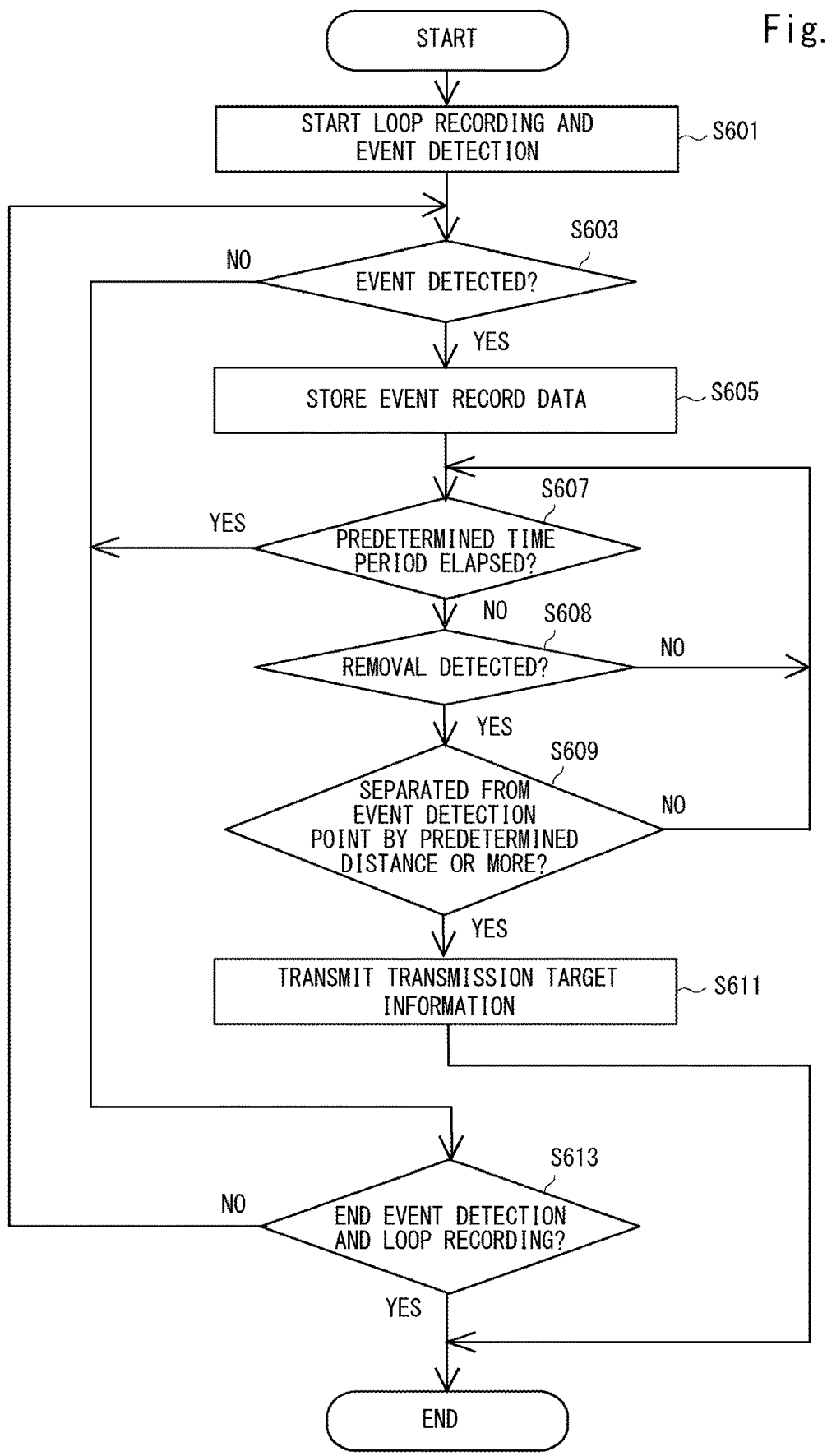
FIG. 13 is a flowchart showing a recording control method executed by the recording control apparatus according to the sixth embodiment.

FIG. 13 is a flowchart showing a recording control method executed by the recording control apparatus 100 according to the sixth embodiment. Since the processing of Steps S601 to S607 in the flowchart of FIG. 13 is substantially the same as the processing of Steps S101 to S107 in the flowchart of FIG. 5, description thereof is omitted. In addition, since the processing of Steps S609 to S613 in the flowchart of FIG. 13 is substantially the same as the processing of Steps S109 to S113 in the flowchart of FIG. 5, description thereof is omitted.

If it is determined in Step S607 that the predetermined time period has not elapsed (NO in Step S607), the removal detection unit 181 of the recording control apparatus 100 determines whether the recording apparatus 10 has been removed from the vehicle (Step S608). If it is detected that the recording apparatus 10 has been removed from the vehicle (YES in Step S608), the recording control apparatus 100 determines whether the location of the recording apparatus 10 is separated from the location of the event detection point by a predetermined distance or more (Step S609). On the other hand, if it is determined in Step S608 that the removal of the recording apparatus 10 is not detected (NO in Step S608), the processing flow returns to Step S607.

Since the recording control apparatus 100 according to the sixth embodiment is configured as described above, it is possible to more reliably estimate that a malicious party or the like has taken away the recording apparatus 10 and escaped. That is, in the condition in the first embodiment that the determination about the recording apparatus 10 being taken away only depends on the distance between the location of the recording apparatus 10 and the location where the event is detected, there is a possibility that the transmission target information may be transmitted even if the vehicle continues travelling without stopping after an event unrelated to the accident is detected. For example, the event detection unit 128 detects that an event has occurred when large acceleration is detected due to a wheel of a vehicle riding on a curb or the like. On the other hand, if it is determined that the recording apparatus 10 is removed from the vehicle and the location of the recording apparatus 10 is separated from the location of the event detection point by the predetermined distance or more, the possibility that the malicious party or the like has taken away the recording apparatus 10 and escaped is extremely high. Therefore, in the sixth embodiment, it is possible to further prevent or minimize unnecessary transmission of data.

Modified Example

The present disclosure is not limited to the above-described embodiments, and may be suitably modified without departing from the spirit. For example, the order of the processing in the flowchart can be changed as appropriate. One or more of the processing in the flowchart described above may be omitted. For example, the processing of S101 and S113 of FIG. 5 may be omitted.

The above-described embodiments may be implemented in combination with each other. For example, the second and third embodiments may be combined. In this case, the recording apparatus 10 may transmit the transmission target information to the external apparatus 20 when it is detected that the recording apparatus 10 is separated from the location of the event detection point by the predetermined distance or more at the predetermined speed or more and in a posture different from that at the time of event detection, within a predetermined time period after the event is detected. Alternatively, the recording apparatus 10 may transmit the transmission target information to the external apparatus 20 when it is detected that the recording apparatus 10 is separated from the location of the event detection point by the predetermined distance or more at the predetermined speed or more or the recording apparatus 10 is in a posture different from that at the time of event detection, within a predetermined time period after the event is detected. It is needless to say that the fifth embodiment or sixth embodiment may be combined with any of the second to fourth embodiments. In this case, for example, the processing of S509 in FIG. 11 can be replaced with the processing of S209, S309, or S409. The same applies to the processing of Step S609 in FIG. 13.

In the above embodiments, each element described in the drawing as a functional block for performing various processes can be constituted by a CPU, a memory, and other circuits in terms of hardware, and can be implemented by a program loaded in a memory or the like in terms of software. Accordingly, it is understood by those skilled in the art that these functional blocks may be implemented in a variety of ways by hardware only, software only, or combinations thereof, and is not limited to either.

The above program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Compact Disc-Read Only Memory), CD-R (CD-Recordable), CD-R/W, (CD-ReWritable) and semiconductor memories (such as Mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The recording control apparatus according to these embodiments can be used, for example, as a dashboard camera.

What is claimed is:

1. A recording control apparatus comprising:
a processor coupled to a memory storing instructions to permit the processor to function as:
 a photographing data acquisition unit configured to acquire photographing data photographed by a photographing unit;
 an event detection unit configured to detect an event of a mobile object;
 a recording control unit configured to store the photographing data for a predetermined time period corresponding to the event detected by the event detection unit as event record data in a recording unit;
 a location information acquisition unit configured to acquire location information of a recording apparatus including at least the recording control unit;
 a removal detection unit configured to detect removal of the recording apparatus from a moving body in response to reception of a signal indicating the removal of the recording apparatus from the moving body; and
 a communication control unit configured to perform control for transmitting, to another apparatus, the location information of the recording apparatus acquired by the location information acquisition unit or the event record data stored in the recording unit when the removal detection unit detects that the recording apparatus is removed from the moving body and a location of the recording apparatus is separated from a location where the event is detected by a predetermined distance or more within a predetermined time period after the event is detected.

2. The recording control apparatus according to claim 1, wherein the communication control unit is configured to perform control for transmitting, to the another apparatus, the location information of the recording apparatus acquired by the location information acquisition unit or the event record data stored in the recording unit when the location of the recording apparatus is separated from the location where the event is detected by the predetermined distance or more at a predetermined speed or more within a predetermined time period after the event detection unit detects an event.

3. The recording control apparatus according to claim 1, further the instructions permitting the processor to function as:
 a posture information acquisition unit configured to acquire posture information of the recording apparatus,
 wherein the communication control unit is configured to perform control for transmitting, to the another apparatus, the location information of the recording apparatus acquired by the location information acquisition unit or the event record data stored in the recording unit when it is detected that the recording apparatus is separated from the location where the event is detected by the predetermined distance or more in a posture different from that at the time of event detection within the predetermined time period after the event detection unit detects the event.

4. The recording control apparatus according to claim 1, further the instructions permitting the processor to function as:
 a posture information acquisition unit configured to acquire posture information of the recording apparatus, wherein
 the communication control unit is configured to perform control for transmitting, to the another apparatus, the location information of the recording apparatus acquired by the location information acquisition unit or the event record data stored in the recording unit to the other apparatus when it is detected that the location of the recording apparatus is separated from the location where the event is detected by the predetermined distance or more while the posture of the recording apparatus is being varied within the predetermined time period after the event detection unit detects the event.

5. The recording control apparatus according to claim 1, further the instructions permitting the processor to function as:
 a power amount acquisition unit configured to acquire a power amount of an internal power supply of the recording apparatus,
 wherein the communication control unit is configured to perform control for selectively transmitting, to the other apparatus, the location information of the recording apparatus or the event record data stored in the recording unit to the another apparatus based on the power amount of the internal power supply.

6. A recording apparatus comprising:
the recording control apparatus according to claim 1;
the photographing unit;
a display unit configured to display the photographing data photographed by the photographing unit;
the recording unit;
a GNSS reception unit configured to output a GNSS reception signal to the location information acquisition unit; and
an internal power supply configured to supply power to the recording apparatus.

7. A recording control apparatus controlling a recording apparatus, the recording control apparatus comprising:
a processor coupled to a memory storing instructions to permit the processor to function as:
a photographing data acquisition unit configured to acquire photographing data photographed by a photographing unit;
an event detection unit configured to detect an event of a mobile object;
a recording control unit configured to store the photographing data for a predetermined time period corresponding to the event detected by the event detection unit as event record data in a recording unit;
a location information acquisition unit configured to acquire location information of a recording apparatus including at least the recording control unit;
a communication control unit configured to perform control for transmitting, to an other apparatus being set in advance for an owner of the recording apparatus or the mobile object, the location information of the recording apparatus acquired by the location information acquisition unit or the event record data stored in the recording unit when a location of the recording apparatus is separated from a location where the event is detected by a predetermined distance or more within a predetermined time period after the mobile object has stopped due to an occurrence of the event; and
a removal detection unit configured to detect removal of the recording apparatus from a moving body in response to reception of a signal indicating the removal of the recording apparatus from the moving body,
wherein the communication control unit is configured to perform control for transmitting, to the other apparatus, the location information of the recording apparatus acquired by the location information acquisition unit or the event record data stored in the recording unit to the other apparatus when the removal detection unit detects that the recording apparatus is removed from the moving body and it is detected that the location of the recording apparatus is separated from the location where the event is detected by the predetermined distance or more within the predetermined time period after the event detection unit detects the event.

8. The recording control apparatus according to claim 7, wherein the communication control unit is configured to perform control for transmitting, to the other apparatus, the location information of the recording apparatus acquired by the location information acquisition unit or the event record data stored in the recording unit when the location of the recording apparatus is separated from the location where the event is detected by the predetermined distance or more at a predetermined speed or more within a predetermined time period after the event detection unit detects an event.

9. The recording control apparatus according to claim 7, further the instructions permitting the processor to function as:
a posture information acquisition unit configured to acquire posture information of the recording apparatus,
wherein the communication control unit is configured to perform control for transmitting, to the other apparatus, the location information of the recording apparatus acquired by the location information acquisition unit or the event record data stored in the recording unit when it is detected that the recording apparatus is separated from the location where the event is detected by the predetermined distance or more in a posture different from that at the time of event detection within the predetermined time period after the event detection unit detects the event.

10. The recording control apparatus according to claim 7, further the instructions permitting the processor to function as:
a posture information acquisition unit configured to acquire posture information of the recording apparatus,
wherein the communication control unit is configured to perform control for transmitting, to the other apparatus, the location information of the recording apparatus acquired by the location information acquisition unit or the event record data stored in the recording unit to the other apparatus when it is detected that the location of the recording apparatus is separated from the location where the event is detected by the predetermined distance or more while the posture of the recording apparatus is being varied within the predetermined time period after the event detection unit detects the event.

11. The recording control apparatus according to claim 7, further the instructions permitting the processor to function as:
a power amount acquisition unit configured to acquire a power amount of an internal power supply of the recording apparatus,
wherein the communication control unit is configured to perform control for selectively transmitting, to the other apparatus, the location information of the recording apparatus or the event record data stored in the recording unit to the other apparatus based on the power amount of the internal power supply.

12. A recording apparatus comprising:
the recording control apparatus according to claim 10;
the photographing unit;
a displayer configured to display the photographing data photographed by the photographing unit;
the recording unit;
a GNSS receiver configured to output a GNSS reception signal to the location information acquisition unit; and
an internal power supply configured to supply power to the recording apparatus.

13. A recording control method performed by a recording control apparatus controlling a recording apparatus, the recording control method comprising:
acquiring photographing data photographed by a photographing unit;
detecting an event of a mobile object;
storing the photographing data for a predetermined time period corresponding to the event detected by the event detection unit as event record data in a recording unit;

acquiring location information of a recording apparatus for storing at least the event record data in the recording unit;

performing control for transmitting, to another apparatus being set in advance for an owner of the recording apparatus or the mobile object, the location information of the recording apparatus or the event record data stored in the recording unit when a location of the recording apparatus is separated from a location where the event is detected by a predetermined distance or more within a predetermined time period after the mobile object has stopped due to an occurrence of the event;

detecting removal of the recording apparatus from a moving body in response to reception of a signal indicating the removal of the recording apparatus from the moving body; and performing control for transmitting, to the another apparatus, the location information of the recording apparatus acquired in the acquiring location information or the event record data stored in the recording unit to the another apparatus when it is detected that the recording apparatus is removed from the moving body and it is detected that the location of the recording apparatus is separated from the location where the event is detected by the predetermined distance or more within the predetermined time period after the event detection unit detects the event.

* * * * *